(12) United States Patent
Kuroda et al.

(10) Patent No.: US 6,504,259 B1
(45) Date of Patent: Jan. 7, 2003

(54) ENGINE AUTOMATIC START STOP CONTROL APPARATUS

(75) Inventors: Shigetaka Kuroda, Wako (JP); Takashi Kiyomiya, Wako (JP); Atsushi Matsubara, Wako (JP); Shinichi Kitajima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/637,251

(22) Filed: Aug. 14, 2000

(30) Foreign Application Priority Data

Aug. 16, 1999 (JP) .......................................... 11-230132

(51) Int. Cl.⁷ ................................................ F02N 11/06
(52) U.S. Cl. .................. 290/40 C; 290/38 E; 477/167; 477/183; 180/65.2
(58) Field of Search ............................ 290/40 C, 40 A, 290/40 R, 38 E, 51; 477/167, 181, 184; 180/65.2, 65.3; 123/179.3, 179.4

(56) References Cited

U.S. PATENT DOCUMENTS

| | | | | |
|---|---|---|---|---|
| 4,006,723 A | * | 2/1977 | Schmidli | 123/179.2 |
| 4,402,286 A | * | 9/1983 | Pagel et al. | 123/179.3 |
| 4,466,392 A | | 8/1984 | Uchida, et al. | 123/179 G |
| 4,481,425 A | * | 11/1984 | Hori et al. | 290/51 |
| 4,500,794 A | * | 2/1985 | Hamano et al. | 290/38 C |
| 4,510,396 A | * | 4/1985 | Uchida et al. | 290/30 R |
| 4,533,011 A | * | 8/1985 | Heidemeyer et al. | 180/65.2 |
| 5,529,549 A | * | 6/1996 | Moyer | 477/189 |
| 5,984,034 A | * | 11/1999 | Morisawa et al. | 180/65.2 |
| 6,019,183 A | * | 2/2000 | Shimasaki et al. | 180/165 |
| 6,109,237 A | * | 8/2000 | Pels et al. | 123/339.11 |
| 6,258,008 B1 | * | 7/2001 | Tabata et al. | 477/107 |
| 6,334,499 B1 | * | 1/2002 | Matsubara et al. | 180/65.2 |
| 6,358,180 B1 | * | 3/2002 | Kuroda et al. | 477/183 |

* cited by examiner

Primary Examiner—Joseph Waks
(74) Attorney, Agent, or Firm—Armstrong, Westerman & Hattori, LLP

(57) ABSTRACT

An engine automatic start stop control apparatus controls an engine of a vehicle to be automatically stopped or started in response to driving conditions of a vehicle. Particularly, the apparatus is applied to the vehicle that performs idle stop control for reduction of discharge gas. Herein, the apparatus controls the engine to restart based upon determination for restarting the engine under an engine stop mode. Namely, the apparatus controls the engine to restart if a driver depresses a clutch pedal or if a driver does not depress a brake pedal during an engine stall in which engine speed becomes zero. Thus, it is possible to restart the engine by prescribed operations even if the driver mistakenly recognizes that the engine is stopped by automatic stop control although the engine actually stalls due to an error operation of the driver so that the engine speed becomes zero. This improves drivability for the driver who handles the vehicle, particularly a hybrid vehicle which is capable of independently running by using an electric motor only.

4 Claims, 20 Drawing Sheets

ENGINE AUTOMATIC START STOP CONTROL APPARATUS

BACKGROUND OF THE INVENTION

1. Field of the Invention

This invention relates to engine automatic start stop control apparatuses that automatically stop engines idling in accordance with prescribed conditions.

This application is based on Patent Application No. Hei 11-230132 filed in Japan, the content of which is incorporated herein by reference.

2. Description of the Related Art

Recently, people pay attention to environmental problems such as increasing temperature on the earth. So, automobile manufacturers and institutes are actively developing electric vehicles and hybrid vehicles to reduce discharges of gases and matters such as carbon dioxide. The electric vehicles are optimal solutions to the environmental problems because of zero discharge of gas. Under the present situation, however, the electric vehicles must be further developed to cope with technological disadvantages, as follows:

(i) The present electric vehicles are capable of running short distances with one-time electric charging.

(ii) The electric vehicles do not sufficiently catch up with capabilities and practical performance of the conventional vehicles using internal-combustion engines.

The hybrid vehicles are equipped with engines and motors, wherein batteries are charged in response to rotations of the engines. In prescribed low ranges of engine speeds where the engines produce relatively large amounts of carbon-dioxide discharges, the hybrid vehicles solely activate the motors or they activate both of the engines and motors in parallel, so it is possible to reduce amounts of carbon-dioxide discharges. The hybrid vehicles are practical solutions to the environmental problems because they are capable of reducing the carbon-dioxide discharges while securing performance (e.g., running distance and drivability) of the conventional vehicles. Recently, automobile manufacturers produce a variety of hybrid vehicles of practical use that are capable of running long distances by themselves.

In order to reduce amounts of discharges such as carbon dioxide and nitrogen oxide (NOx), engineers propose and develop an engine automatic stop start technique in which during a stop of a vehicle, an engine idling is stopped, then, the engine is started.

However, this technique is designed, regardless of an engine stall event, as follows:

In a hybrid vehicle, for example, when a driver makes an error operation to stop the vehicle under engagement of a clutch, an engine stall is caused to occur. In that case, the driver does not always recognize occurrence of the engine stall because of the error operation. In addition, the driver may mistakenly recognize that an idle stop control is made because the vehicle is stopped. In the event of the engine stall which is caused by the error operation of the driver, the engine is not stopped by the idle stop control. So, in order to normally restart the vehicle to run, the driver must operates a starter key to restart the engine running.

Since the driver mistakenly recognizes that the engine is stopped by the idle stop control, it is not expected for the driver to operate the starter key to restart the engine. Because the engine is stopped by the error operation of the driver, even if the driver drives the vehicle to start, the vehicle does not start from an idle stop state of the engine. In that case, acceleration may be differed from expected one at the start of the vehicle. So, the driver may have a feeling of wrongness because of "unwanted" acceleration. This causes a problem in that drivability is damaged.

SUMMARY OF THE INVENTION

It is an object of the invention to provide an engine automatic start stop control apparatus applicable to vehicles each of which is designed to perform idle stop control for reduction of discharge gas. Herein, the apparatus is capable of controlling restart operations of the vehicle without damaging drivability even if an engine of the vehicle stalls due to error operation of a driver.

This invention basically relates to an engine automatic start stop control apparatus that controls an engine to be automatically stopped and started in response to driving conditions of a vehicle.

According to a first aspect of the invention, the engine automatic start stop control apparatus comprises an engine speed detection device (18, SB12) for detecting engine speed of the engine, a clutch detection device (SB18) for detecting depression of a clutch pedal, an automatic stop detection device (18, SB10) for detecting an automatic stop mode of the engine, and an automatic start device (18, SB10–SB68) for automatically starting the engine if the clutch detection device detects the depression of the clutch pedal, the engine speed detection device detects that the engine speed is zero, and the automatic stop detection device does not detect the automatic stop mode of the engine.

In the above, the automatic start device controls the engine to restart based upon determination for restarting the engine under the engine stop mode. In addition, it controls the engine to restart if the driver depresses the clutch pedal although the engine stalls due to an error operation of the driver so that the engine speed becomes zero.

That is, the engine is restarted by operations for restarting the engine in the automatic stop mode even if the driver mistakenly recognizes that the engine is stopped by the automatic stop control although the engine stalls due to the error operation of the driver. Thus, it is possible to improve drivability for the driver who handles the vehicle.

According to a second aspect of the invention, the engine automatic start stop control apparatus comprises an engine speed detection device (18, SD12) for detecting engine speed of the engine, a brake detection device (SD22) for detecting depression of a brake pedal, an automatic stop detection device (18, SD10) for detecting an automatic stop mode of the engine, and an automatic start device (18, SD10–SD40) for automatically starting the engine if the brake detection device does not detect the depression of the brake pedal, the engine speed detection device detects that the engine speed is zero, and the automatic stop detection device does not detect the automatic stop mode of the engine.

In the above, the automatic start device controls the engine to restart if the driver depresses the brake pedal although the engine stalls due to the error operation of the driver so that the engine speed becomes zero.

According to a third aspect of the invention, the engine automatic start stop control apparatus is applicable to a hybrid vehicle that installs an electric motor (16) in addition to the engine (10) as driving sources of wheels.

Because the hybrid vehicle is capable of independently running by only using the electric motor, there is a great probability in that the driver fails to recognize the engine stall. The apparatus is capable of avoiding an unwanted situation where the battery coupled to the electric motor cannot be electrically charged for a long time because the engine stall continues.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENTS

This invention will be described in detail by way of examples with reference to the accompanying drawings.

Figure 1:
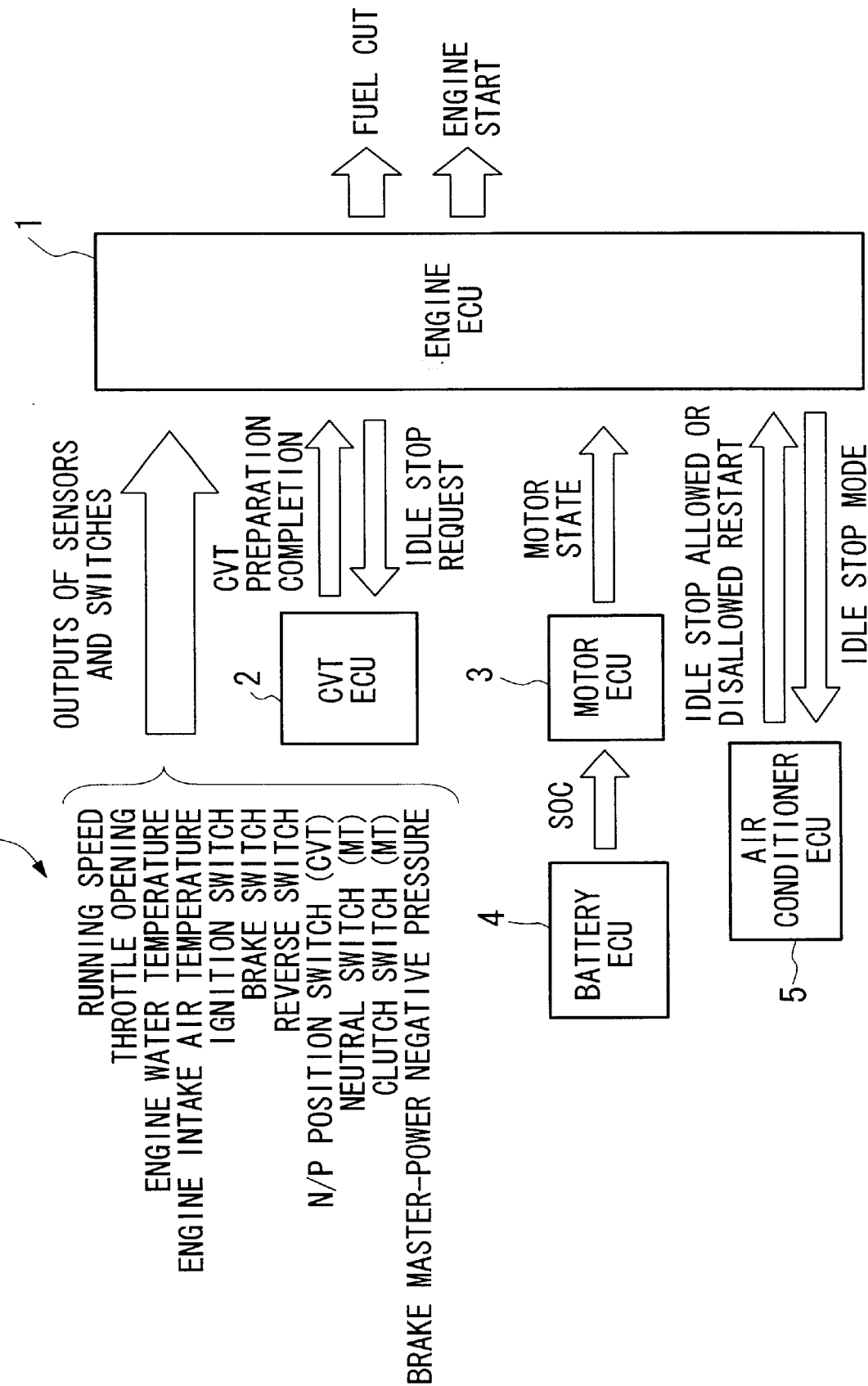
FIG. 1 is a block diagram showing an outline configuration of an engine automatic start stop control apparatus in accordance with the invention.

FIG. 1 shows an outline configuration of an engine automatic start stop control apparatus in accordance with this invention. The engine automatic start stop control apparatus is realized by an engine ECU 1, which controls fuel supply to an engine (not shown) to start or stop. Basically, the engine ECU 1 performs prescribed engine controls based on outputs of sensors and switches, which are designated by a reference symbol P1 in FIG. 1.

As outputs of the sensors and switches, the reference symbol P1 designates running speed of a vehicle, an opening degree of an acceleration pedal, engine water temperature, engine intake air temperature, ON/OFF of an ignition switch, ON/OFF of a brake, a shift position, ON/OFF of a clutch (which is used in case of a manual-transmission (MT) vehicle) and master-power negative pressure of the brake equipped with a servo device.

In the case of a vehicle equipped with a continuously variable transmission (CVT), the engine ECU 1 issues an idle stop request to a CVT ECU 2. So, the engine ECU 1 performs prescribed engine controls only when the CVT ECU 2 outputs a signal declaring that the CVT completes preparation for an idle stop operation. This is because of mechanism of the CVT, details of which will be described later.

Incidentally, the present specification use terminology of "idle stop" to mainly represent a stop of an engine idling and further represent a stop of fuel supply at a deceleration mode in accordance with prescribed conditions, which will be described later.

In the case of a hybrid vehicle equipped with a motor in addition to an engine, there are provided a battery ECU 4 and a motor ECU 3. Herein, the battery ECU 4 is used to control states (e.g., remaining battery charge (or state of charge) and temperature) of a battery which is a power source for the motor, while the motor ECU 3 is used to control states (e.g., rotating speed) of the motor. Specifically, the battery ECU 4 outputs "SOC" (or "State of Charge") representing the remaining battery charge of the battery, while the motor ECU 3 outputs a motor state signal representing a present state of the motor as to whether the motor can be started or not, for example. Thus, the engine ECU 1 performs prescribed engine controls based on the SOC output from the battery ECU 4 and the motor state signal output from the motor ECU 3. The engine ECU 1 operates based on the aforementioned factors to cope with special conditions of the hybrid vehicle, as follows:

Even if the engine is automatically stopped by an idle stop operation, the battery supplies electric power to several members (e.g., ECUs, head lights, winkers (or turn signals)). So, if those members consume the electric power too much, the engine cannot be restarted or the motor cannot be driven after restarting of the engine due to reduction of electric charge of the battery.

Normally, the vehicles (or automobiles) sold on the market are frequently equipped with air conditioners, compressors of which are driven by engines. Therefore, the vehicles equipped with automatic idle stop controls cannot drive the air conditioners during stop of the engine idling. By merely performing engine controls based on states of vehicles such as running speeds and engine speeds, it is impossible to provide drivers with comfortable driving conditions in response to variations of outside air temperature which becomes higher or lower than a comfortable range of temperature for drivers. For this reason, the engine automatic start stop control apparatus of FIG. 1 installs a air conditioner ECU 5 for controlling states of the air conditioner. Hence, the engine ECU 1 performs prescribed engine controls based on operating conditions of the air conditioner which are set by a driver.

[A] First Embodiment

Now, an engine automatic start stop control apparatus will be described in further detail in accordance with a first embodiment of the invention.

Figure 2:
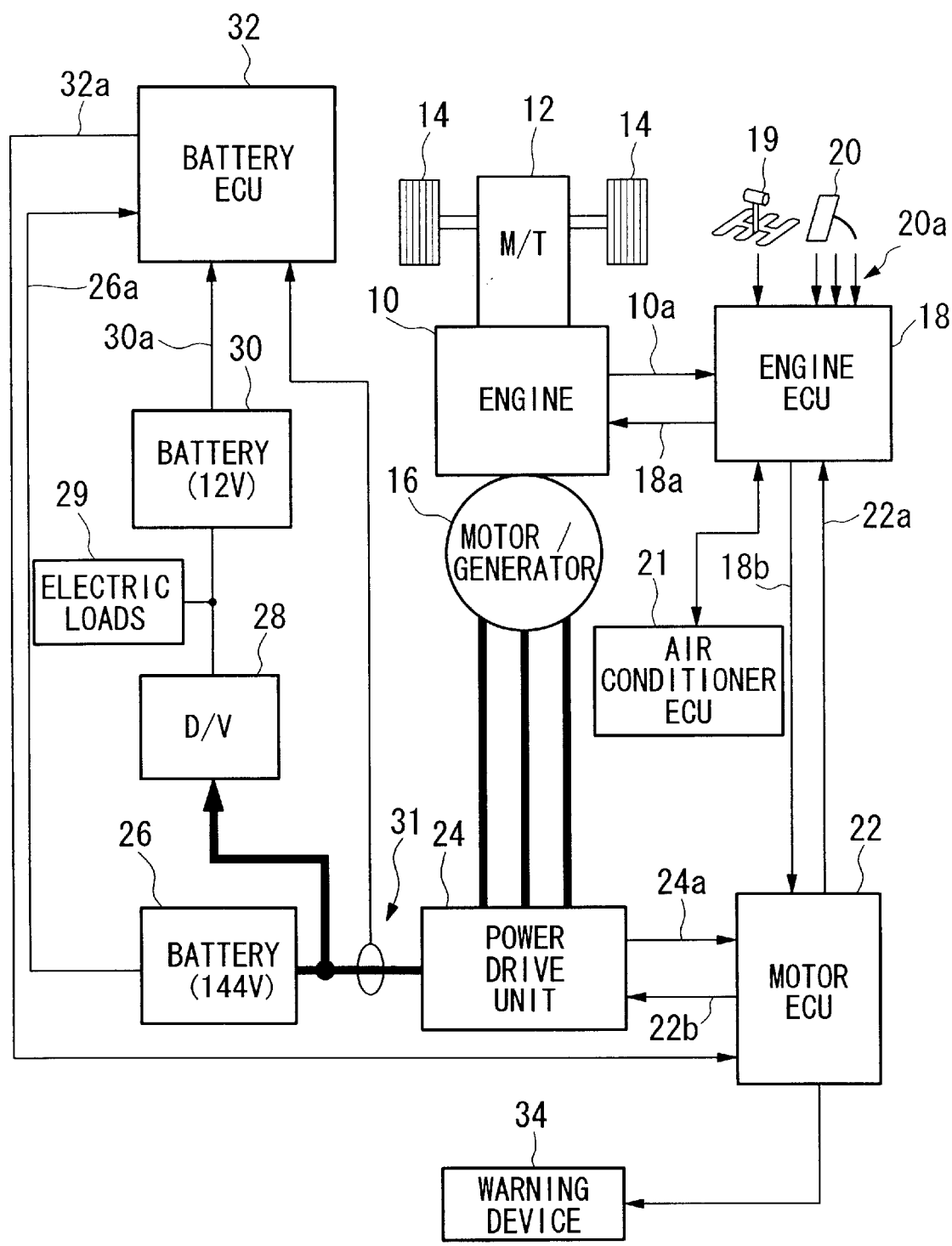
FIG. 2 is a block diagram showing a concrete configuration of the engine automatic start stop control apparatus in accordance with a first embodiment of the invention.

FIG. 2 shows a configuration of the engine automatic start stop control apparatus of the first embodiment. The first embodiment is designed for a hybrid vehicle equipped with a manual transmission (MT).

In FIG. 2, an engine 10 produces driving power, which is transmitted to wheels 14 by means of a manual transmission 12. Each of the wheels (or some of the wheels) 14 is equipped with a pulse generator (not shown) which generates a pulse by every rotation. An engine ECU 18 calculates running speed of the vehicle based on intervals of time measured between the pulses generated by the wheels 14. In addition, the apparatus installs a motor/generator 16, which operates with a three-phase AC power supply, in parallel with the engine 10. A rotation shaft of the motor/generator 16 is directly connected with a rotation shaft of the engine 10. When the engine 10 is stopped, the motor/generator 16 plays a role as a motor to produce driving power, which is transmitted to the wheels 14 by means of the manual transmission 12. When the engine 10 is running, the rotation shaft of the motor/generator 16 is rotated by the engine 10 so that the motor/generator 16 plays a role as a generator for generating electric power.

By way of a signal line 10a, an engine ECU 18 inputs from the engine 10 various signals, which represent engine speed Ne, air intake passage pressure Pb, water temperature TW and intake air temperature, for example. In addition, the engine ECU 18 also inputs depression signals, as to whether a driver depresses pedals 20 by his/her (i.e., his or her) foot or not respectively, by way of signal lines 20a. In response to those signals, the engine ECU 18 produces control signals for controlling fuel supply and ignition timing, which are supplied to the engine 10 by way of a signal line 18a. A temperature sensor for measuring the intake air temperature of the engine 10 is arranged inside of an air intake passage, which is laid between an air cleaner (not shown) and the engine 10, for example. The aforementioned pedals 20 correspond to an acceleration pedal, a clutch pedal and a brake pedal. In the case of the acceleration pedal, the engine ECU 18 receives a depression signal and a depression angle signal ($\theta_{Th}$) representing a depression angle of the acceleration pedal. Further, the engine ECU 18 receives a gear-select signal, representing a gear that the driver selects by operating a shift lever 19. Furthermore, the engine ECU 18 receives from an air conditioner ECU 21 a signal as to whether an idle stop control of the engine is allowed or disallowed in response to its setting made by the driver.

The engine ECU 18 is connected with a motor ECU 22 by way of signal lines 18b, 22a. By way of the signal line 18b, the engine ECU 18 outputs to the motor ECU 22 control signals which initiate a motor/generator 16 to operate and which designate its output power. By way of the signal line 22a, the motor ECU 22 outputs to the engine ECU 18 signals which represent remaining battery charge and an amount of output current of a battery 26, details of which will be described later.

A power drive unit 24 is connected with the motor/generator 16 and is also connected with the motor ECU 22 by way of a signal line 22b. In response to control signals given from the motor ECU 22, the power drive unit 24 converts a DC power supply from the battery 26 to three-phase AC power having prescribed magnitudes in electricity, which is supplied to the motor/generator 16. The power drive unit 24 detects phase currents and full currents that flow through the motor/generator 16. Detected phase currents and full currents are supplied to the motor ECU 22 by way of the signal line 24a. In consideration of the detected phase currents and full currents given from the power drive unit 24, the motor ECU 22 performs (arithmetic) operations to designate an amount of electric power being supplied to the motor/generator 16 in such a way that the motor/generator 16 actually produces the output power designated by the foregoing control signal which is given from the engine ECU 18 by way of the signal line 18b.

A current detector 31 is installed and arranged between the battery 26 and the power drive unit 24. The current detector 31 detects output currents of the battery 26. Detected currents are supplied to the battery ECU 32. The battery 26 is equipped with a voltage detector and a temperature detector, both of which are not shown in FIG. 2. Detected voltage and temperature of the battery 26 are sent to a battery ECU 32 by way of a signal line 26a.

A downverter 28 is connected between the power drive unit 24 and the battery 26. The downverter 28 converts output DC voltage of the power drive unit 24 or battery 26 to prescribed voltage, which is 12V, for example. The downverter 28 is connected with a battery 30 whose output voltage is 12V and electric loads 29. The electric loads 29 include loads due to wipers and headlights as well as loads due to control devices such as the engine ECU 18, motor ECU 22 and battery ECU 32. The battery 30 is equipped with a voltage detector and a current detector, both of which are not shown in FIG. 2. Detected voltage and current of the battery 30 are sent to the battery ECU 32 by way of a signal line 30a.

The battery ECU 32 normally monitors states of the batteries 26, 30 such as remaining battery charge, temperature and currents, for example. Specifically, the battery ECU 32 detects remaining battery charge and output currents of the battery 26 as well as output currents of the battery 30, so that detection results are forwarded to the motor ECU 22 by way of a signal line 32a.

A warning device 34 warns the driver of conditions of the engine 10 as to whether the engine idling is stopped or not. The warning device 34 is arranged at a prescribed location on a display panel of the vehicle close to a driver's seat, for example. Under an idle stop condition where the engine idling is controlled to be stopped when the vehicle is stopped, the warning device 34 turns on and off a lamp (or lamps) if the driver moves his/her foot off from the clutch pedal, in other words, if the clutch pedal is released to establish a full-close state of the clutch. Restarting the engine 10 is carried out in accordance with driver's intention. In addition, the engine 10 is also automatically restarted in response to reduction of the remaining battery charge of the battery 26, for example. In this case, the engine 10 is not restarted unless the driver depresses the clutch pedal deeply by his/her foot. Therefore, the driver is informed of a restart request of the engine 10 by depression of the clutch pedal. When a door of the vehicle is opened under an idle stop mode, the warning device 3 informs the driver that the engine idling is stopped by alarm sounds or by turning on a lamp (or lamps) used for indication of the idle stop mode.

Next, overall operations of the vehicle will be described in connection with the engine automatic start stop control apparatus, which is configured in accordance with the first embodiment of the invention.

Firstly, a description will be given with respect to an engine running mode in which the vehicle runs with driving power of the engine 10.

When the driver depresses the pedal 20 by his/her foot, signals corresponding a type of the pedal being depressed are forwarded to the engine ECU 18 by way of the signal line 20a. In response to the signals, the engine ECU 18 outputs control signals to the engine 10 by way of the signal line 18a. That is, the engine ECU 18 controls fuel supply and ignition timing to control operations of the engine 10.

The engine 10 outputs signals representative of engine speed, air intake passage pressure and water temperature to the engine ECU 18 by way of the signal line 10a. Based on those signals, the engine ECU 18 controls operations of the engine 10 over the signal line 18a. In addition, the motor/generator 16 generates electric power in response to rotations of the engine 10. The electric power generated by the motor/generator 16 is supplied to the battery 26 by way of the power drive unit 24, so that the battery 26 is being electrically charged. In addition, the electric power is also delivered to the battery 30 by way of the downverter 28, so that the battery 30 is being electrically charged as well. The current detector 31 detects electric currents that flow from the power drive unit 24 to the battery 26, so that a detection result is forwarded to the battery ECU 32.

Secondly, a description will be given with respect to a motor running mode in which the vehicle runs with driving power of the motor/generator 16.

When the driver depresses the pedal 20 (i.e., acceleration pedal) by his/her foot, the engine ECU 18 produces a control signal based on a depression angle of the acceleration pedal if the remaining battery charge of the battery 26 is greater than a prescribed value. The control signal is supplied to the motor ECU 22 by way of the signal line 18b. Thus, the motor ECU 22 outputs a control signal to the power drive unit 24, which controls rotations of the motor/generator 16.

As described above, outline operations are described with respect to the engine running mode in which the vehicle is driven only by the engine 10 and the motor running mode in which the vehicle is driven only by the motor/generator 16. Concretely speaking, the engine idling is controlled to be stopped by the engine ECU 18 in response to conditions being established by signals output from sensors and switches as well as outputs of the air conditioner ECU 21, motor ECU 22 and battery ECU 32. That is, the engine idling is stopped under a prescribed idle stop condition, or the engine is restarted under a prescribed engine restart condition, for example.

Next, descriptions will be given with respect to controls for the engine idling to be stopped or restarted.

To reduce exhaust gas and improve drivability (or manual operation to handle the vehicle), the engine automatic start stop control apparatus of the present embodiment stops and restarts the engine idling under the following conditions.

(1) Engine Stop During Deceleration

The apparatus automatically stops the engine in response to a driver's intention to stop the vehicle which is detected under the following conditions:

(i) The driver continues depressing the brake pedal while running speed of the vehicle is under prescribed speed.
 (ii) The driver depresses the clutch pedal while engine speed is under prescribed speed.

For example, the apparatus automatically stops the engine if the driver continues depressing the brake pedal while the running speed of the vehicle is under 30 km/h, or if the driver depresses the clutch pedal while the engine speed is under 1000 rpm. Even if the engine is automatically stopped because of the aforementioned conditions being established, the engine is restarted when the driver changes a gear. The engine is also restarted if the vehicle is not completely stopped so that the vehicle still continues running.

(2) Idle Stop of the Engine of the Vehicle Which is Stopped

The apparatus automatically stops the engine in response to a driver 's intention to stop the vehicle which is detected when the driver depresses the clutch pedal or shifts gear to neutral at a low running speed which is lower than a prescribed running speed. For example, the engine is stopped when the driver depresses the clutch pedal or shifts gear to neutral at a low running speed which is lower than 5 km/h. Even if the engine is stopped because of the aforementioned conditions being established, the engine is restarted when the driver changes gear. The engine is also restarted if the vehicle is not completely stopped so that the vehicle still continues running. Controls of this mode (2) are performed independently of controls of the aforementioned mode (1). That is, the present embodiment is not designed such that the engine is restarted after the engine is stopped by the controls of the aforementioned mode (1), then, the engine is stopped again by the controls of this mode (2). In other words, the controls of this mode (2) are used to certainly stop the engine even if the foregoing conditions of the mode (1) are not established because the driver makes a special operation such that the vehicle is decelerated by depression of the clutch pedal only at a running speed of 40 km/h, for example.

(3) Idle Stop Inhibition of the Engine After Restarting

This mode is provided to cope with a special gear-change operation in which the driver puts gear to neutral again after the vehicle restarts to run under an in-gear state. That is, the apparatus allows the engine idling to be stopped in response to the gear-change operation at once. However, if the driver makes the gear-change operations two times or more, the apparatus inhibits the engine idling from being stopped until the running speed of the vehicle reaches a prescribed speed, e.g., 3 km/h. Under congestion, the driver frequently repeats stop-and-go operations in which the vehicle runs a small distance at a low speed, then, the vehicle is stopped by shifting gear to neutral. If such operations are continuously repeated under an engine stop mode in which the engine is stopped so that the vehicle runs with driving power of the battery, electric power of the battery would be greatly consumed. For this reason, the present apparatus is designed in principle to allow the engine idling to be stopped in response to a single gear-change operation in which the driver shifts gear to neutral if the vehicle restarts to run under an in-gear state but running speed does not reach the prescribed speed. However, the present apparatus inhibits the engine idling from being stopped if the vehicle restarts to run again under the in-gear state, then, the driver shifts the gear to neutral again before the running speed reaches the prescribed speed.

The above describe basic controls for the engine idling to be stopped and restarted. The present embodiment is designed to perform more precise controls, which will be described below.

(4) Sudden Acceleration Measure

This measure is provided to prevent the vehicle from suddenly starting, regardless of the driver's intention, because of idle stop release conditions of the engine being established during an idle stop mode. Under the condition where the driver depresses the clutch pedal to put gear to neutral during the idle stop mode, the present apparatus allows the engine to restart in response to following operations:

(i) The driver depresses the acceleration pedal.

(ii) The remaining battery charge is reduced to be lower than a threshold.

(iii) The air conditioner requests to restart the engine.

The present embodiment does not control the engine to restart merely in response to neutral gear. Because, it is necessary to avoid a sudden start of the vehicle having a trouble in which a switch detecting "neutral" malfunctions due to some errors to normally output a signal declaring "neutral".

(5) Idle Stop Communication

In order to communicate the driver that the apparatus stops the engine idling, the warning device 34 (see FIG. 2) turns on and off the lamp to indicate that the engine idling is stopped.

For example, the warning device 34 turns on and off the lamp when the driver leaves his/her foot off from the clutch pedal so that the clutch is placed in a full close state under a condition where the engine idling is controlled to be stopped with respect to the vehicle which is stopped. Restarting the engine is not necessarily made only by the driver's intention to restart the vehicle. That is, the engine is also restarted if the remaining battery charge of the battery 26 becomes lower than the prescribed value, which is described in connection with the aforementioned mode (4). Incidentally, the engine is not restarted unless the driver depresses the clutch pedal. Hence, the apparatus informs the driver of an engine restart request in response to depression of the clutch pedal.

(6) Alarm Sound

This is provided to cope with mistaken assumption in which the driver mistakenly judges that the vehicle is completely stopped because the engine idling is stopped. In this case, the warning device 34 informs the driver of the idle stop mode by producing alarm sound or by turning on the lamp indicating the idle stop mode.

(7) Cooperation with Air Conditioner

The apparatus makes a decision as to whether the engine idling is stopped or not in response to operating conditions of the air conditioner. Normally, the air conditioner is provided to control an interior temperature of the vehicle. If the driver feels that the interior temperature is very low or high, the driver operates the air conditioner to rapidly decrease or increase the temperature. In this case, if the apparatus has a priority in consumption of the electric power of the battery by which the air conditioner is controlled to be stopped under the idle stop mode, comfortableness of the vehicle is damaged. To cope with such a disadvantage, the apparatus controls the engine idling to be stopped, or the apparatus disregards the operating conditions of the air conditioner.

(8) Control Based on Detection Result of Brake Master Power Negative Pressure Sensor Cars in these days are generally equipped with servo devices that assist drivers to reduce depression pressures being applied to brake pedals. If the driver continues depressing the brake pedal under an engine stop mode, the servo device is decreased in negative pressure so that servo assistance to depression of the brake pedal is correspondingly decreased. This makes the driver to need a great depression pressure being applied to the brake pedal. In this case, the apparatus starts the engine to secure sufficient negative pressure for the servo device of the brake.

(9) Improvement of Manual Operation to Handle the Vehicle

In order to improve manual operations for the driver to handle the vehicle, there are provided two types of controls by the apparatus. That is, the first type of control is to inhibit the engine idling from being stopped for a prescribed time (e.g., two minutes) after the driver turns on an ignition switch. The second type of control is to inhibit the engine idling from being stopped in a reverse in-gear state in which the driver selects a reverse gear. It is necessary to perform the first type of control because of the following reasons:

Normally, the engine remains warm for an hour or so after the driver stops the vehicle in a parking place, so it is possible to stop the engine idling. In general, the driver may be obligated to slow down the vehicle in the parking place, in other words, it is inconvenient for the driver that the apparatus repeats to stop and restart the engine idling while the vehicle moves in the parking place at a low speed. To cope with such an inconvenience, the apparatus employs the first type of control to improve functions thereof.

It is necessary to perform the second type of control because of the following reasons:

In order to put the vehicle into a garage, the driver repeats forward and backward movements of the vehicle. So, it is inconvenient for the driver that the apparatus stops the engine idling every time the vehicle moves forward or backward. To cope with such an inconvenience, the apparatus employs the second type of control to improve functions thereof.

Next, idle stop conditions and restart conditions of the engine will be described with reference to FIGS. 3A and 3B. Specifically, FIG. 3A is a logic diagram showing the idle stop conditions of the engine, and FIG. 3B is a logic diagram showing the restart conditions of the engine.

Figure 3A:
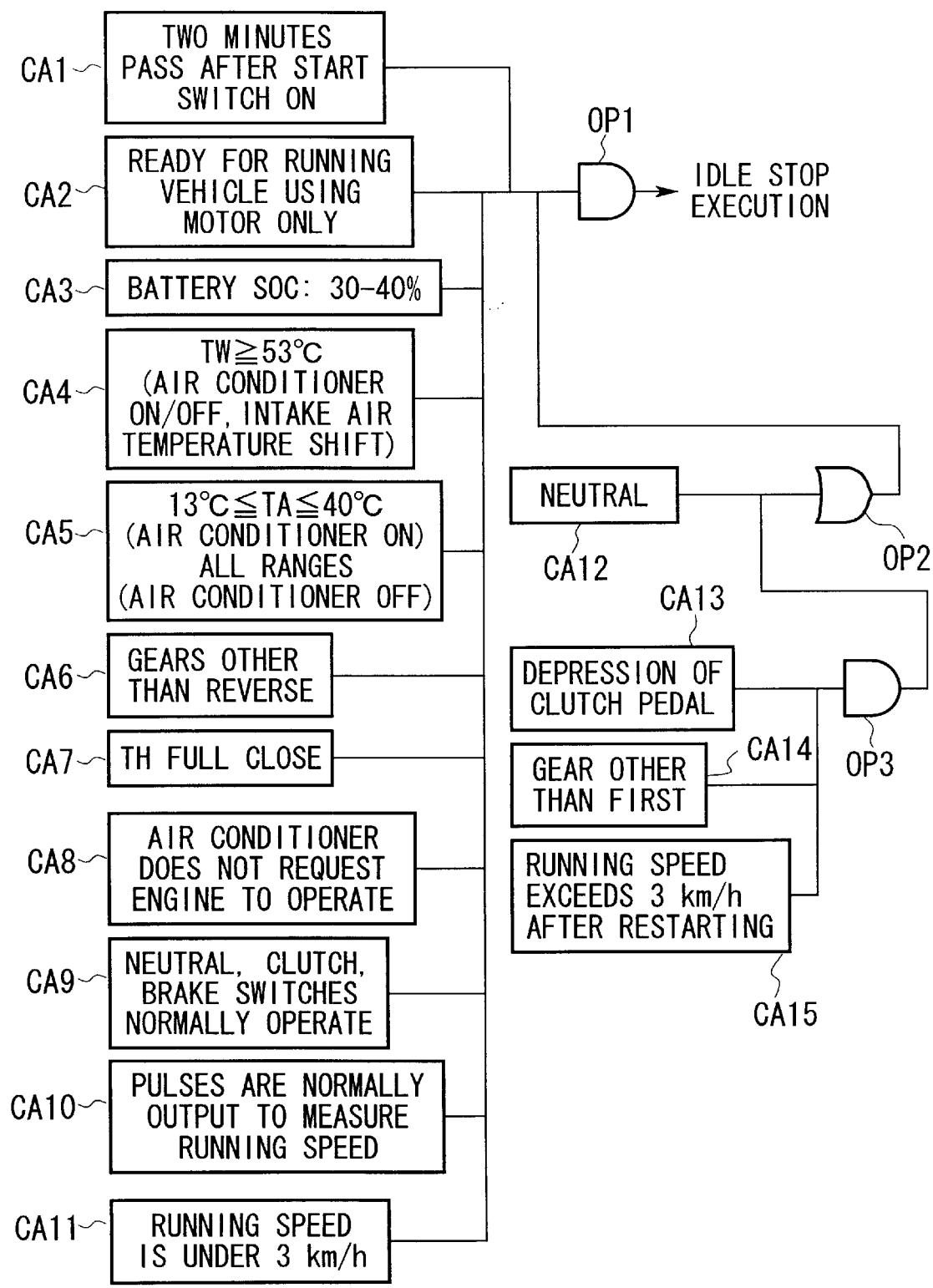
FIG. 3A is a logic diagram showing a sequence of conditions for determination and control for stopping an engine idling.
Figure 3B:
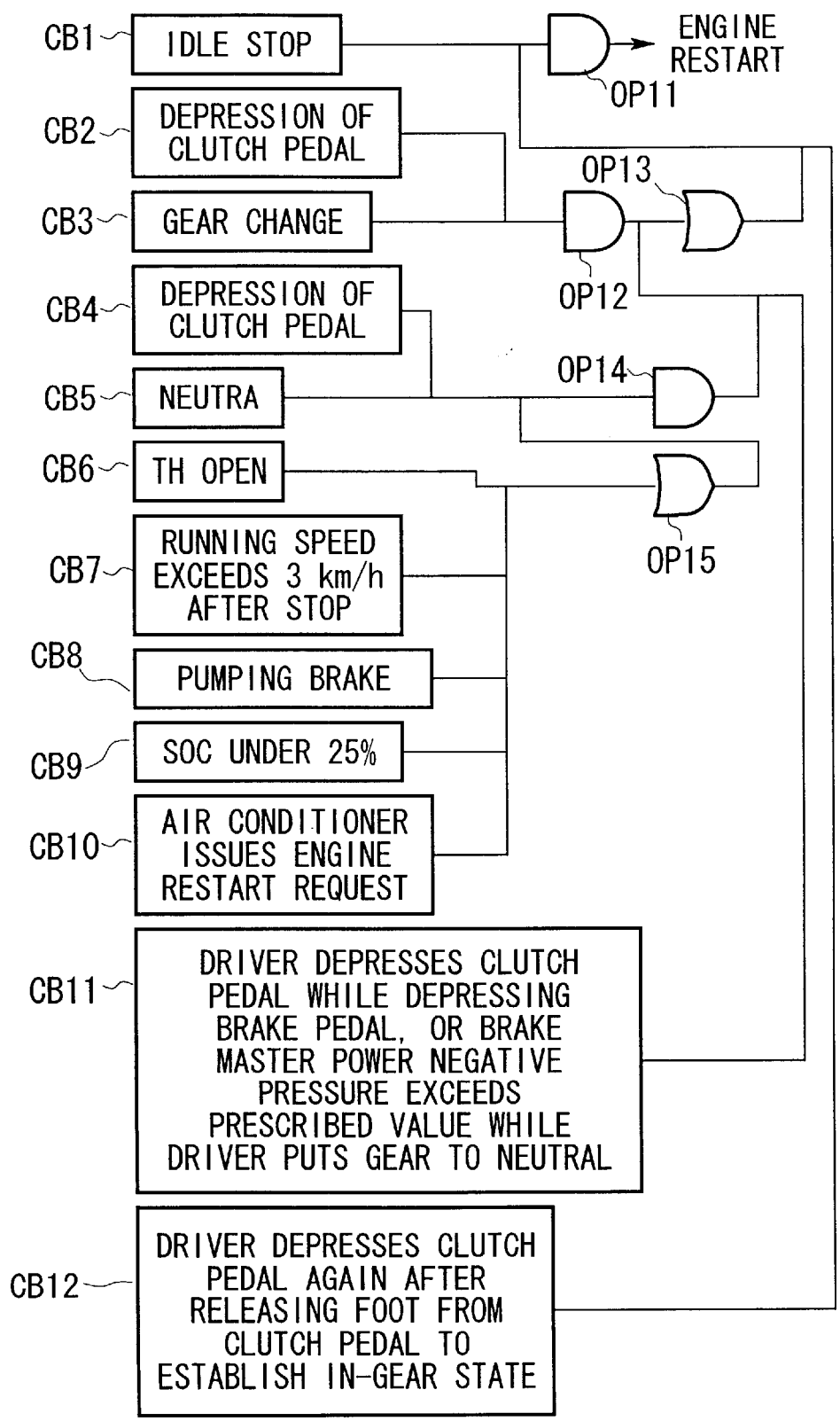
FIG. 3B is a logic diagram showing a sequence of conditions for determination and control for restarting an engine.

In FIG. 3A, conditions CA13 to CA15 are logically connected together by an AND operator OP3. In addition, a condition CA12 and an output of the AND operator OP3 are logically connected together by an OR operator OP2. Further, an output of the OR operator OP2 and conditions CA1 to CA11 are logically connected together by an AND operator OP1. Thus, the AND operator OP1 outputs a signal implementing the engine idling to be stopped. That is, the apparatus stops the engine idling when all the conditions CA1 to CA11 and the conditions CA13 to CA15 are established or when all of the conditions CA1 to CA11 and the condition CA12 are established.

Specifically, the condition CA1 is established when a prescribed time (e.g., two minutes) elapses after a starter switch is turned on. This condition CA1 is used for the first type of control described in (9). The condition CA2 is established when the vehicle is ready for starting using only the motor/generator 16 shown in FIG. 2. In the case of the hybrid vehicle, only the motor/generator 16 is frequently used to restart the vehicle after the engine idling is stopped in order to reduce exhaust gas. Therefore, the condition CA2 constructs a precondition for the idle stop of the engine.

The condition CA3 is established if remaining battery charge of the battery 26 belongs to a prescribed range of electricity, which is a range between 30% and 40% against full battery charge, for example. Like the aforementioned conditions CA3, the hybrid vehicle frequently uses only the motor/generator 16 to restart after the engine idling is stopped in order to reduce exhaust gas. Therefore, the condition CA3 constructs a precondition for the idle stop of the engine.

Next, a description will be given with respect to remaining battery charge of the battery 26. Generally speaking, the battery 26 has different characteristics in connection with high and low remaining battery charges. Under the high remaining battery charge (e.g., 80% or more of the full battery charge), an output voltage of the battery 26 increases substantially in proportion to the remaining battery charge. Under the low remaining battery charge (e.g., 20% of the full battery charge), an output voltage of the battery 26 decreases in proportion to the remaining battery charge. If the remaining battery charge is moderate or appropriate, in other words, if the remaining battery charge belongs to a prescribed range of electricity between 20% and 80% against the full battery charge, the output voltage of the battery 26 is retained substantially constant. For practical use, such a range of electricity is used for the battery 26. As described above, the practical use range of electricity of the battery is determined in connection with the remaining battery charge. In order to ease controls with regard to accumulated electricity, the present embodiment provides three different control zones (or ranges) in consideration of the remaining battery charge of the battery 26 and consumption of electricity of the battery 30.

Figure 4A:
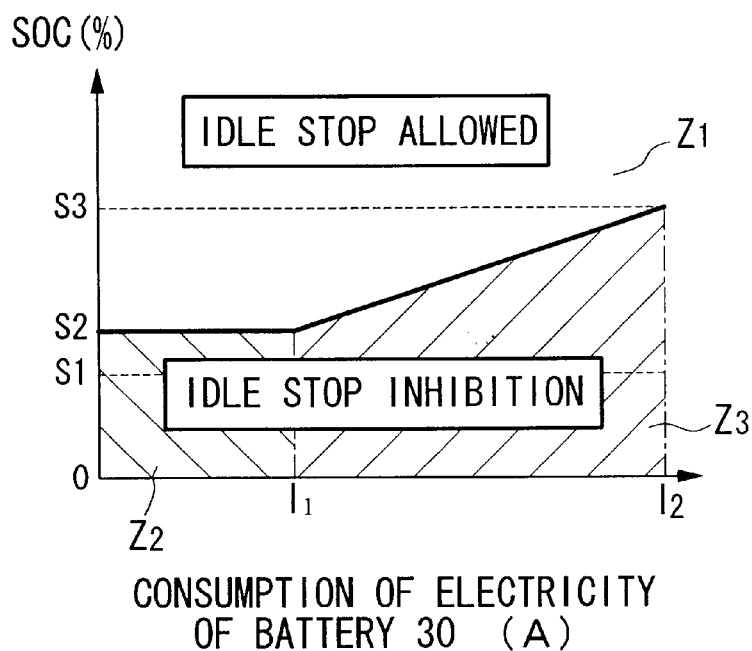
FIG. 4A is a graph showing zones for idle stop controls of an engine in connection with relationships between remaining battery charge and consumption of electricity.
Figure 4B:
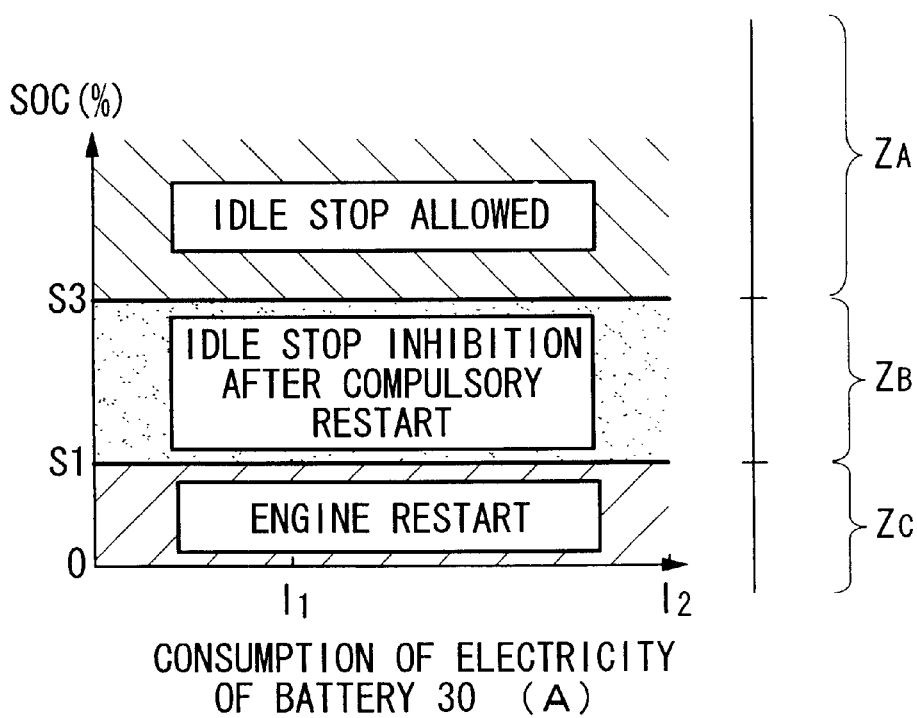
FIG. 4B is a graph showing zones for idle stop and restart controls of an engine in connection with relationships between remaining battery charge and consumption of electricity.

The present embodiment sets various control zones in response to remaining battery charge (SOC) of the battery 26, which will be described with reference to FIGS. 4A and 4B. FIG. 4A is used to explain decisions as to whether the engine idling is stopped or not in a normal running mode of the vehicle. FIG. 4B is used to explain decisions as to whether the engine is restarted or not during an idle stop mode of the engine.

FIG. 4A shows three zones for the decisions whether to stop the engine idling or not, wherein those zones are mainly classified in consideration of the remaining battery charge of the battery 26 and consumption of electricity of the battery 30. That is, a first zone $Z_1$ designates allowance of execution of the idle stop of the engine because the remaining battery charge of the battery 26 is high. A second zone $Z_2$ designates inhibition of the idle stop of the engine because consumption of electricity of the battery 30 is small and the remaining battery charge of the battery 26 is relatively low. A third zone $Z_3$ designates inhibition of the idle stop of the engine because the consumption of electricity of the battery 30 is large.

In a graph of FIG. 4A, three values are plotted as S1, S2, S3 on a vertical axis with respect to the remaining battery charge (SOC). Herein, S1 designates a lower limit in a use zone of the battery 26, e.g., 20%. S2 designates a boundary used for determination of execution of the idle stop of the engine if the consumption of electricity of the battery 30 is relatively small. In addition, two values are plotted as $I_1$, $I_2$ on a horizontal axis with respect to the consumption of electricity of the battery 30, which is represented using amounts of currents (Ampere) being consumed. The aforementioned values S2, S3 and the values $I_1$, $I_2$ are used for determination whether to stop the engine idling if the consumption of electricity of the battery 30 becomes large. That is, four parameters are used to control the idle stop of the engine if the consumption of electricity of the battery 30 becomes large. This is because the remaining battery charge of the battery 26 is reduced in a short period of time if the consumption of electricity of the battery 30 becomes large. For this reason, the present embodiment gives strict conditions for allowance of execution of the idle stop of the engine. That is, the present embodiment makes every effort to prevent the remaining battery charge from being reduced in a short period of time by allowance of execution of the idle stop of the engine if the remaining battery charge is relatively high.

In FIG. 3, the conditions CA4, CA5 are used for allowance of the idle stop of the engine in response to operations of the air conditioner and are established if outside air temperature TA and water temperature TW belong to prescribed ranges of values. Generally, the air conditioner operates when the driver intentionally sets certain temperature in the driver's seat. If stopping the engine idling is made irrelevantly to the operations of the air conditioner, there is a possibility in that comfortableness in the interior space of the vehicle is being damaged due to the idle stop of the engine. So, it is necessary to provide the condition CA5. If the idle stop of the engine is made, the engine does not discharge high-temperature exhaust gas, which is produced due to fuel combustion, so that the catalyzer is reduced in operating temperature. Temperature reduction of the catalyzer brings an increase of discharge gas. The condition CA4 is used to avoid temperature reduction of the catalyzer so that the discharge gas will not be increased. This condition is related to controls of the aforementioned mode (7).

Figure 5A:
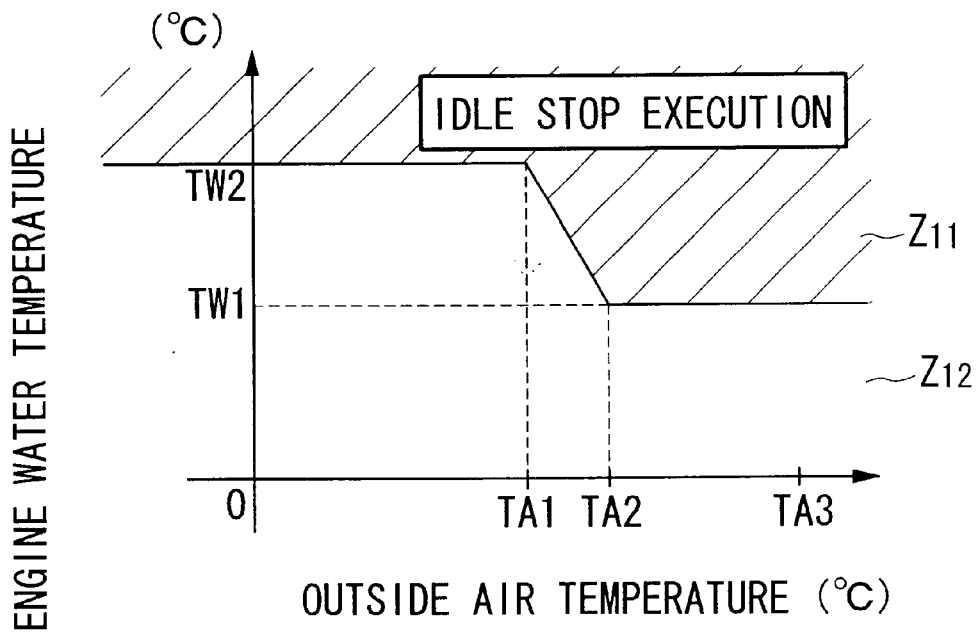
FIG. 5A is a graph showing conditions for idle stop controls of the engine when an air conditioner is stopped.
Figure 5B:
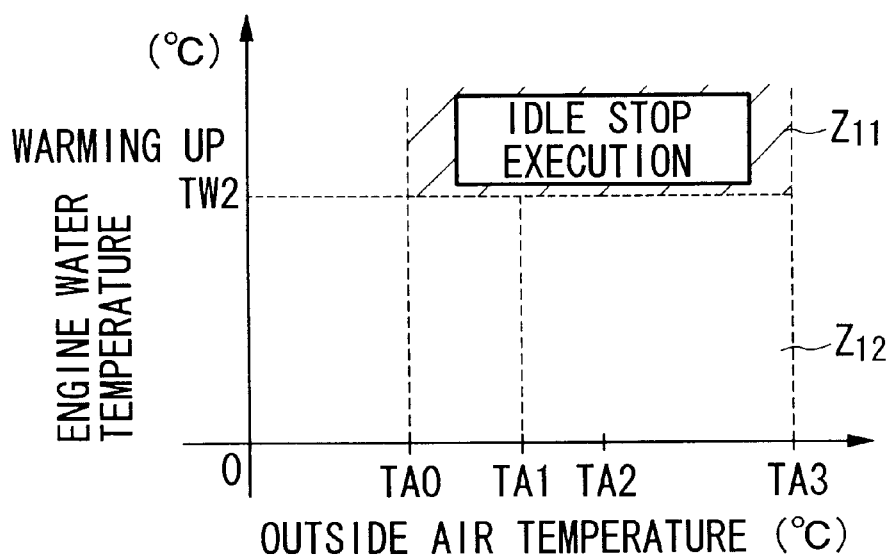
FIG. 5B is a graph showing conditions for idle stop controls of the engine when the air conditioner is operating.

Next, relationships between the conditions CA4 and CA5 will be described with reference to FIGS. 5A and 5B. FIG. 5A shows conditions as to whether the idle stop of the engine is executed or not if the driver stops the air conditioner. FIG. 5B shows conditions as to whether the idle stop of the engine is executed or not if the air conditioner is operating. Both of FIGS. 5A, 5B show two zones, namely, $Z_{11}$ designates execution of the idle stop of the engine, and $Z_{12}$ designates disallowance of the idle stop of the engine. Incidentally, each of graphs of FIGS. 5A, 5B is defined by a vertical axis representing engine water temperature and a horizontal axis representing outside air temperature.

If the air conditioner is stopped, comfortableness of the interior space of the vehicle is not damaged so much even if the idle stop of the engine is executed to stop the compressor of the air conditioner. In this case, the present embodiment performs controls in consideration of reduction of operating temperature of the catalyzer. In FIG. 5A, if the engine water temperature is under a value TW1 (which is plotted on the vertical axis), the present apparatus does not execute idle stop of the engine so that the engine 10 is running continuously. This is a basic control of the apparatus if the air conditioner is stopped. If outside air temperature is lower than a preset value TA1 (which is plotted on the horizontal axis), it is observed that the operating temperature of the catalyzer is reduced at a rapid pace over a lapse of time. To cope with it, the present embodiment sets a value TW2 which is higher than the value TW1 with respect to the engine water temperature. That is, if the outside air temperature is under the preset value TA1, the apparatus executes idle stop of the engine if the engine water temperature is equal to or higher than the value TW2. In a temperature range in which the outside air temperature decreases from TA2 to TA1, the zone $Z_{11}$ allowing execution of the idle stop of the engine is narrowed in response to a slope between TW1 and TW2 with respect to the engine water temperature. Thus, it is possible to suppress reduction of the operating temperature of the catalyzer by increasing an operating time of the engine. Incidentally, the values TA1 and TA2 of the outside air temperature are set at 15° C. and 20° C. respectively, while the values TW1 and TW2 of the engine water temperature are set at 50° C. and 75° C. respectively.

If the air conditioner is operating, it is necessary to control the idle stop of the engine in consideration of the comfortableness of the interior space of the vehicle and the temperature reduction of the catalyzer. That is, if the outside air temperature is very low or very high, the apparatus does not execute the idle stop of the engine in consideration of the comfortableness of the interior space of the vehicle. In FIG. 5B, if the outside air temperature is under TA0 or if it is equal to or higher than TA3 (where values TA0, TA3 are both plotted on the horizontal axis), the apparatus does not execute the idle stop of the engine. In addition, if the engine water temperature is under the value TW2, the apparatus does not execute the idle stop of the engine in consideration of the temperature reduction of the catalyzer. Incidentally, the values TA0 and TA3 of the outside air temperature are set at 10° C. and 30° C. respectively, for example.

In FIG. 3A, the condition CA6 is established if the driver puts the gear to ones other than reverse. It is described before that in order to put the vehicle into a garage, the driver drives the vehicle to repeatedly move forward and backward. It is inconvenient for the driver to handle the vehicle if the engine 10 is stopped every time the vehicle moves backward. For this reason, the apparatus does not execute idle stop of the engine if the driver puts gear to reverse. In other words, the idle stop of the engine is allowed if the driver puts gear to ones other than reverse. This condition is provided for controls of the aforementioned mode (9).

The condition CA7 is determination as to whether the throttle (or accelerator) is full close or not, in other words, it is determination as to whether the driver depresses the acceleration pedal or not. If the driver depresses the acceleration pedal by his/her foot, it is necessary to detect a driver's intention to accelerate the vehicle, so that the engine 10 should be operated. However, a full close state of the throttle (or accelerator) is judged as one condition for determination of the driver's intention to stop the vehicle, so it is used as one condition for determination of the idle stop of the engine. The condition CA8 is established if the air conditioner does not issue an operation request signal of the engine 10. Some setting of the air conditioner gives a highest priority in controlling the interior temperature of the vehicle to be set in a designated manner. In this case, the air conditioner ECU 21 outputs an operation request signal of the engine 10 to the engine ECU 18. If such an operation request signal is output, it is necessary to operate the engine 10 so that the compressor is activated. In that case, it is impossible to execute idle stop of the engine. This condition is one of conditions used for controls of the aforementioned mode (7).

The condition CA9 is established if all of switches for the neutral gear, clutch pedal and brake pedal operate normally. If troubles occur on those switches, there is a probability in that the vehicle operates against the driver's intention. So, it is necessary to make a decision as to whether those switches operate normally or not in consideration of engine speed, gear change and running speed. This condition is one of conditions used for controls of the aforementioned mode (4).

The condition CA10 is determination as to whether pulse signals indicating running speed of the vehicle are normally output or not. As described before, the wheels 14 are equipped with pulse generators each of which generates a pulse per each rotation. So, the engine ECU 18 calculates the running speed of the vehicle in response to intervals of time between pulses. Idle stop of the engine is executed even if the vehicle is stopped. If the pulse generator(s) goes wrong, the engine ECU 18 may determine that the vehicle is stopped even when the vehicle is actually accelerated. In that case, the apparatus makes a mistake to execute the idle stop of the engine. The condition CA10 is provided to prevent the idle stop of the engine from being mistakenly executed. The condition CA11 is determination as to whether the running speed of the vehicle is under a prescribed value (e.g., 3 km/h) or not. This condition is used for determination as to whether the vehicle is stopped or not.

The condition CA12 is determination as to whether the driver puts gear to neutral or not. The condition CA13 is determination as to whether the driver depresses the clutch pedal by his/her foot or not. In order to stop the vehicle, the driver frequently puts gear to neutral while depressing the clutch pedal. Therefore, the aforementioned conditions are used for determination whether to execute the idle stop of the engine.

The conditions CA14, CA15 are related to determination as to whether the driver puts gear to ones other than first. In the idle stop inhibition after restarting of the aforementioned mode (3), the apparatus controls the idle stop of the engine not to be executed if the driver repeats the foregoing gear-change operations in which the driver puts gear to neutral again when the running speed does not reach the prescribed speed after the vehicle starts running in the in-gear state. In order to execute the idle stop of the engine, it is necessary to make determination whether the driver puts gear to ones other than first and whether the running speed of the vehicle is increased to be equal to or higher than the prescribed speed.

Next, a description will be given with respect to conditions for restarting the engine under the idle stop mode with reference to FIG. 3B.

In FIG. 3B, conditions CB6 to CB10 are logically connected together by an OR operator OP15. An output of the OR operator OP15 and conditions CB4, CB5 are logically connected together by an AND operator OP14. Conditions CB2 and CB3 are logically connected together by an AND operator OP12. An output of the AND operator OP12, an output of the OR operator OP14 and a condition CB11 are logically connected together by an OR operator OP13. An output of the OR operator OP13 and conditions CB1, CB12 are logically connected together by an AND operator OP11. Thus, the AND operator OP11 outputs a signal instructing restart of the engine.

The condition CB1 is determination as to whether the engine idling is stopped or not. Restarting the engine is made after the idle stop of the engine, hence, it is natural to introduce the condition CB1 for determination of engine restart. The condition CB2 is determination as to whether the driver depresses the clutch pedal by his/her foot or not. The condition CB3 is detection of a gear change being made by the driver. Those conditions CB2, CB3 are included in conditions for restarting the engine because the driver normally depresses the clutch pedal and changes gear in order to start the engine.

The condition CB4 is determination as to whether the driver depresses the clutch pedal by his/her foot or not. The condition CB5 is detection as to whether the driver puts gear to neutral or not.

The condition CB6 is determination as to whether the accelerator (or throttle) is fully opened or not. The condition CB6 is logically connected together with the conditions CB4, CB5 by way of the AND operator OP14 and the OR operator OP15. This logic is provided to detect a specific condition where the driver depresses the clutch pedal while putting gear to neutral under the idle stop condition. So, if the driver depresses the acceleration pedal under such a specific condition, the apparatus determines that the driver has an intention to start the engine 10, so that the apparatus controls the engine 10 to restart. In that case, if the driver performs the aforementioned operations but fails to restart the engine 10, the driver feels that an engine trouble occurs. In order to ease inconvenience in handling the vehicle, the apparatus certainly controls the engine 10 to restart when the aforementioned conditions are established.

The condition CB7 is determination as to whether after the vehicle is stopped, running speed becomes greater than a prescribed speed (e.g., 3 km/h) or not. The condition CB8 is determination as to whether the driver performs a so-called pumping brake technique or not. If the driver performs pumping brake operations during the idle stop mode, the servo device is somewhat weakened in negative pressure source thereof so that depression pressure being applied to the brake pedal should be increased to certainly depress the brake pedal. The condition CB8 is provided to avoid such a weakening phenomenon of the servo device. Incidentally, the condition CB8 is provided for controls of the aforementioned mode (8).

The condition CB9 is determination as to whether remaining battery charge of the battery 26 is under 25% against full battery charge or not. If the apparatus continues the idle stop mode under low remaining battery charge, the electric loads 29 (see FIG. 2) consume electricity of the battery 30 so much. To maintain a certain level of remaining battery charge of the battery 30, electric charging of the battery 30 is effected by the battery 26 via the downverter 28. If such charging operation is continued for a long time, remaining battery charge of the battery 26 becomes too small to restart the engine 10. To avoid such a drawback, reduction of the remaining battery charge construct one condition for restarting the engine. This condition is one of conditions for controls of the aforementioned mode (4).

Next, a description will be given with respect to remaining battery charge for restarting the engine with reference to FIG. 4B. FIG. 4B shows relationships between the remaining battery charge (or SOC) of the battery 26 and consumption of electricity of the battery 30. In response to the remaining battery charge, the present embodiment sets three control zones, namely, $Z_A$, $Z_B$ and $Z_C$. That is, the zone $Z_C$ designates engine restart which is compulsorily carried out because the remaining battery charge is low. The zone $Z_B$ designates idle stop inhibition in which the apparatus inhibits idle stop of the engine from being executed even if compulsory restart of the engine is not required because the battery 26 is sufficiently charged by the engine being compulsorily restarted. This is supported by assumption that a time required for compulsorily restarting the engine becomes short by execution of idle stop of the engine even if the battery 26 is charged by the engine being compulsorily restarted so that the remaining battery charge thereof becomes higher than a prescribed value S1 (which is plotted on a vertical axis). That is, it is expected that the apparatus frequently repeats to stop and restart the engine idling even if the remaining battery charge is higher than S1. This deteriorates drivability and manual operations to handle the vehicle. Because of the reasons described above, the present embodiment inhibits the idle stop of the engine from being executed with respect to the zone $Z_B$ of the remaining battery charge. The zone $Z_A$ designates allowance of idle stop of the engine being executed after compulsory restart of the engine. In this zone $Z_A$ in which the remaining battery charge is high, it is expected that the apparatus does not frequently repeats stop and restart of the engine 10 even if the idle stop of the engine is executed. For this reason, the present embodiment allows execution of the idle stop of the engine with respect to the zone $Z_A$.

The condition CB10 is determination as to whether the air conditioner issues an engine restart request or not. This condition is provided to maintain comfortableness of the interior space of the vehicle, in other words, it is one of conditions for controls of the aforementioned mode (4). The condition CB11 is determination as to whether the driver depresses the clutch pedal while depressing the brake pedal or determination as to whether brake master power negative pressure becomes equal to or greater than a prescribed value in gauge pressure under the neutral gear. One example of the prescribed value in gauge pressure is −250 mmHg. The condition CB11 is used for controls of the aforementioned mode (8).

The condition CB12 is determination as to whether after the driver leaves his/her foot off from the clutch pedal to establish an in-gear state, the driver depresses the clutch pedal again or not. In order to start the vehicle, the driver generally depresses the clutch pedal deeply to establish an in-gear state, then, the driver depresses the acceleration pedal while releasing his/her foot from the clutch pedal. In order to start the vehicle in a hurry, the driver frequently conducts operations to release the clutch pedal and establish the in-gear state simultaneously. In such a situation, if the driver fails to timely start the engine, it is impossible to obtain sufficient acceleration in starting the vehicle. For this reason, the present embodiment determines that the driver makes a mistake in manual operations when the driver depresses the clutch pedal again after releasing his/her foot from the clutch pedal to establish the in-gear state. In that case, the apparatus allows the engine to restart.

As described above, the present embodiment sets a variety of conditions for determination of the idle stop and restart of the engine. In order to improve fuel efficiency, the apparatus performs a fuel stop control to the engine 10 during deceleration. This is called a fuel cut, which will be referred to as "deceleration F/C".

Figure 6A:
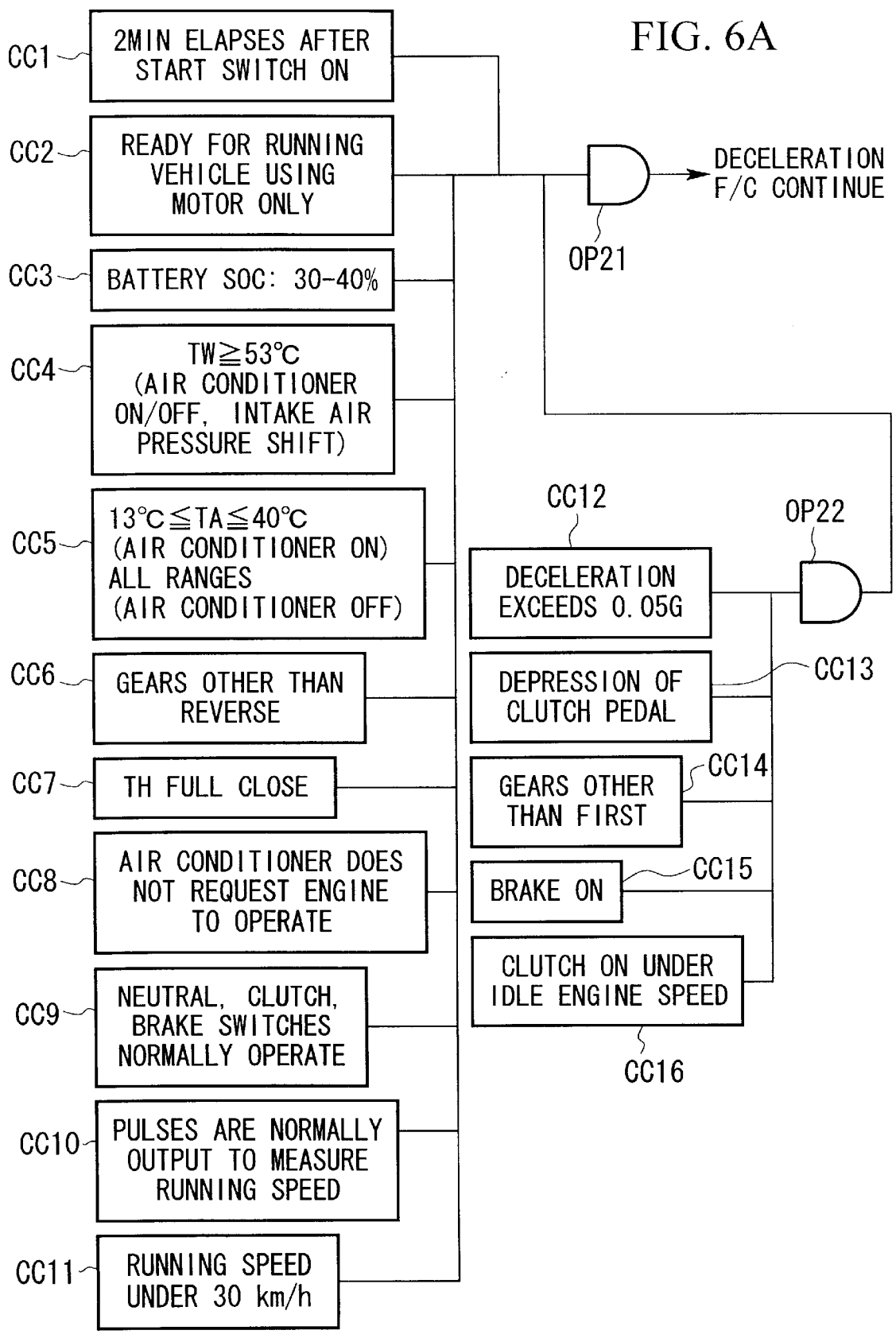
FIG. 6A is a logic diagram showing a sequence of conditions for determination and control of deceleration fuel cut.
Figure 6B:
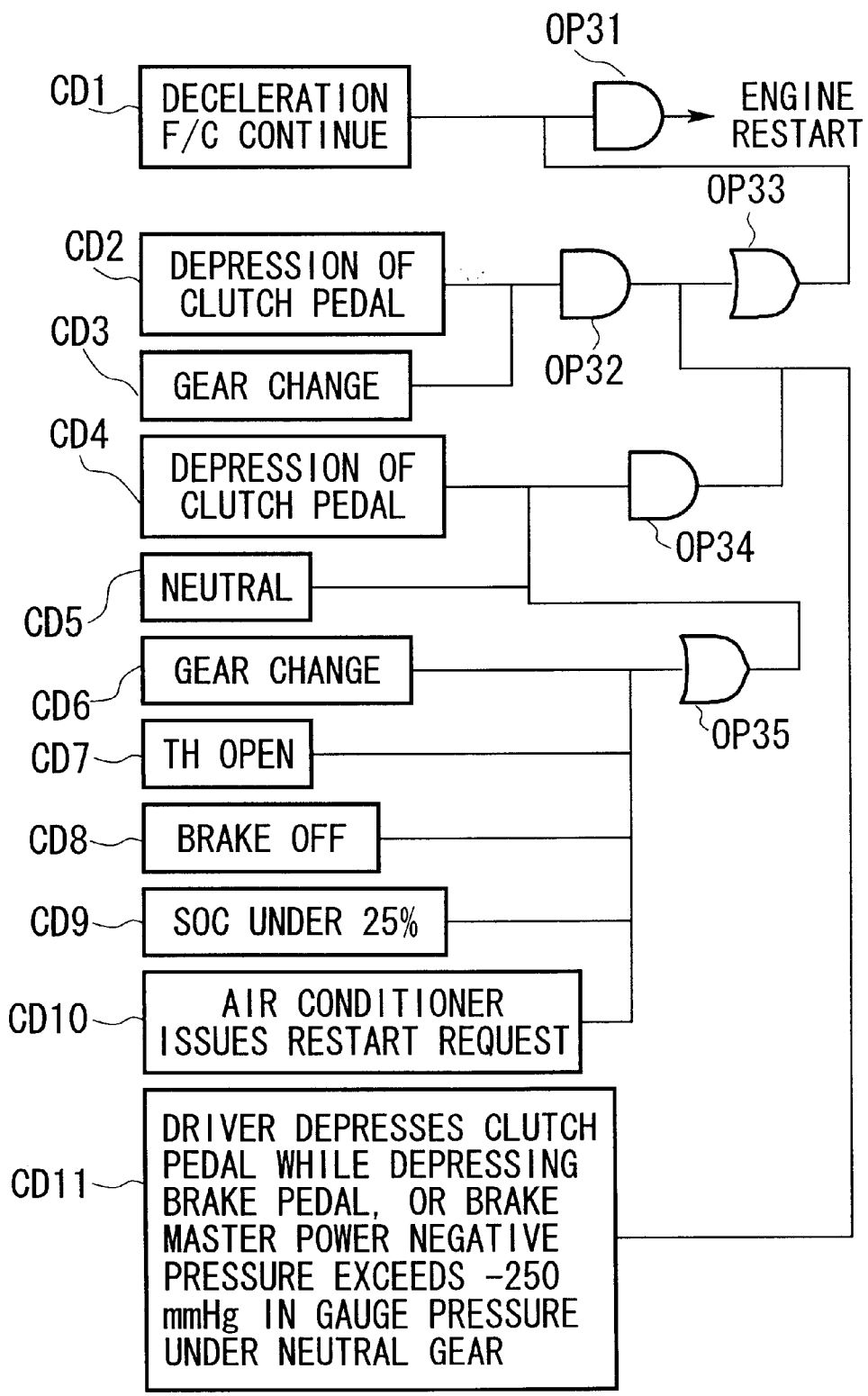
FIG. 6B is a logic diagram showing a sequence of conditions for determination and control of restoration from the deceleration fuel cut.

Next, a description will be given with respect to conditions for the fuel stop control. FIGS. 6A and 6B show summaries of fuel stop control conditions and restoration conditions in accordance with the present embodiment. Specifically, FIG. 6A shows the fuel stop control conditions, and FIG. 6B shows restoration conditions.

In FIG. 6B, conditions CC12 to CC16 are logically connected together by an AND operator OP22. An output of the AND operator OP22 and conditions CC1 to CC11 are logically connected together by an AND operator OP21. In short, only when all the conditions CC1 to CC16 are established, the deceleration F/C is carried out or continued.

The conditions CC1 to CC10 shown in FIG. 6A are respectively identical to the foregoing conditions CA1 to CA10 shown in FIG. 3A. The condition CC11 is determination as to whether running speed of the vehicle is under a prescribed value or not. Herein, the prescribed value of the running speed is set at 30 km/h, for example. The conditions CC12 is determination as to whether deceleration is equal to or greater than a prescribed value or not. Herein, the prescribed value of the deceleration is set at 0.05 G, for example. This condition CC12 is used to determine whether the vehicle running is decelerated or not. The condition CC13 is determination as to whether the driver depresses the clutch pedal or not. In order to stop the vehicle, the driver generally depresses the clutch pedal by his/her foot. Therefore, the condition CC13 is listed as one of conditions for determination as to whether the driver operates the vehicle to stop or not.

The condition CC14 is determination as to whether the driver puts gear to ones other than first or not. A first gear is selected when all of the conditions CC1 to CC12 are established. The first gear is used even when the driver does not intend to stop the vehicle. Therefore, the present embodiment uses the condition CC14 for determination of the deceleration, so that selecting the first gear is detected not to perform the deceleration F/C. The condition CC15 is determination as to whether the driver depresses the brake pedal by his/her foot or not. In order to stop the vehicle, the driver generally depresses the brake pedal. Therefore, the condition CC15 is listed as one of conditions for determination as to whether the driver operates the vehicle to stop or not. The condition CC16 is determination as to whether the driver releases his/her foot from the clutch pedal or not under a low engine speed where engine speed is under an idle speed.

Next, the restoration conditions for the deceleration F/C will be described with reference to FIG. 6B.

In FIG. 6B, conditions CD6 to CD10 are logically connected together by an OR operator OP35. An output of the OR operator OP35 and conditions CD4, CD5 are logically connected together by an AND operator OP34. Conditions CD2 and CD3 are logically connected together by an AND operator OP32. Outputs of the AND operators OP32, OP34 and a condition CD11 are logically connected together by an OR operator OP33. An output of the OR operator OP33 and a condition CD1 are logically connected together by an AND operator OP31. Thus, the AND operator OP31 outputs a signal instructing restart of the engine which is restored from the deceleration F/C.

The condition CD1 is determination as to whether the apparatus continues deceleration F/C or not. The condition CD2 is determination as to whether the driver depresses the clutch pedal by his/her foot or not. The condition CD3 is determination as to whether the driver changes gear or not. Those conditions are listed for determination of engine restart in consideration of normal operations of the driver who depresses the clutch pedal and makes a gear change in order to start the engine.

The condition CD4 is determination as to whether the driver depresses the clutch pedal by his/her foot or not. The condition CD5 is determination as to whether the driver puts gear to neutral or not.

The condition CD6 is determination as to whether the driver changes gear or not. The condition CD7 is determination as to whether the accelerator (or throttle) is opened or not. This condition CD7 is logically connected together with the aforementioned conditions CD4 and CD5 by way of the OR operator OP35 and the AND operator OP34. That is, when the driver depresses the acceleration pedal under the conditions where the driver depresses the clutch pedal and puts gear to neutral while deceleration F/C is continued, the apparatus determines that the driver intentionally starts the engine 10 to operate, so that the engine 10 is restored from the deceleration F/C and is restarted. If the engine 10 fails to start even when the driver performs the aforementioned operations, the driver may feel that a trouble occurs on the engine 10. In order to improve drivability and manual operation to handle the vehicle, the apparatus controls the engine 10 to be restored from the deceleration F/C when the aforementioned conditions are established.

The condition CD8 is determination as to whether the driver leaves his/her foot from the brake pedal or not. The condition CD9 is determination as to whether remaining battery charge of the battery 26 is under a prescribed value or not. Herein, the prescribed value of the remaining battery charge is 25% against full battery charge, for example. If the apparatus continues idle stop of the engine under low remaining battery charge of the battery 26, the electric loads 29 (see FIG. 2) consume electricity of the battery 30. In order to maintain a certain level of electricity of the battery 30, the battery 30 is charged by the battery 26 by way of the downverter 28. If such charging operation is continued for a long time, the remaining battery charge of the battery 26 is reduced too much to restart the engine 10. To avoid such a drawback, reduction of the remaining battery charge of the battery 26 is listed as one of restoration conditions by which the engine 10 is restored from the deceleration F/C.

The condition CD10 is determination as to whether the air conditioner issues a restart request of the engine 10 or not. This condition is one of conditions for maintaining comfortableness of the interior space of the vehicle, in other words, it is one of conditions for controls of the aforementioned mode (4). The condition CD11 is determination as to whether the driver depresses the clutch pedal by his/her foot while depressing the brake pedal or determination as to whether the brake master power negative pressure becomes equal to or greater than a prescribed value in gauge pressure while the driver puts gear to neutral. Herein, the prescribed value is set at −250 mmHg, for example. This condition is used for controls of the aforementioned mode (8).

Next, descriptions will be given with respect to control flows for application and actualization of the idle stop conditions and restart conditions shown in FIGS. 3A, 3B as well as the conditions for continuing the deceleration F/C and restoration conditions shown in FIGS. 6A, 6B.

Figure 7:
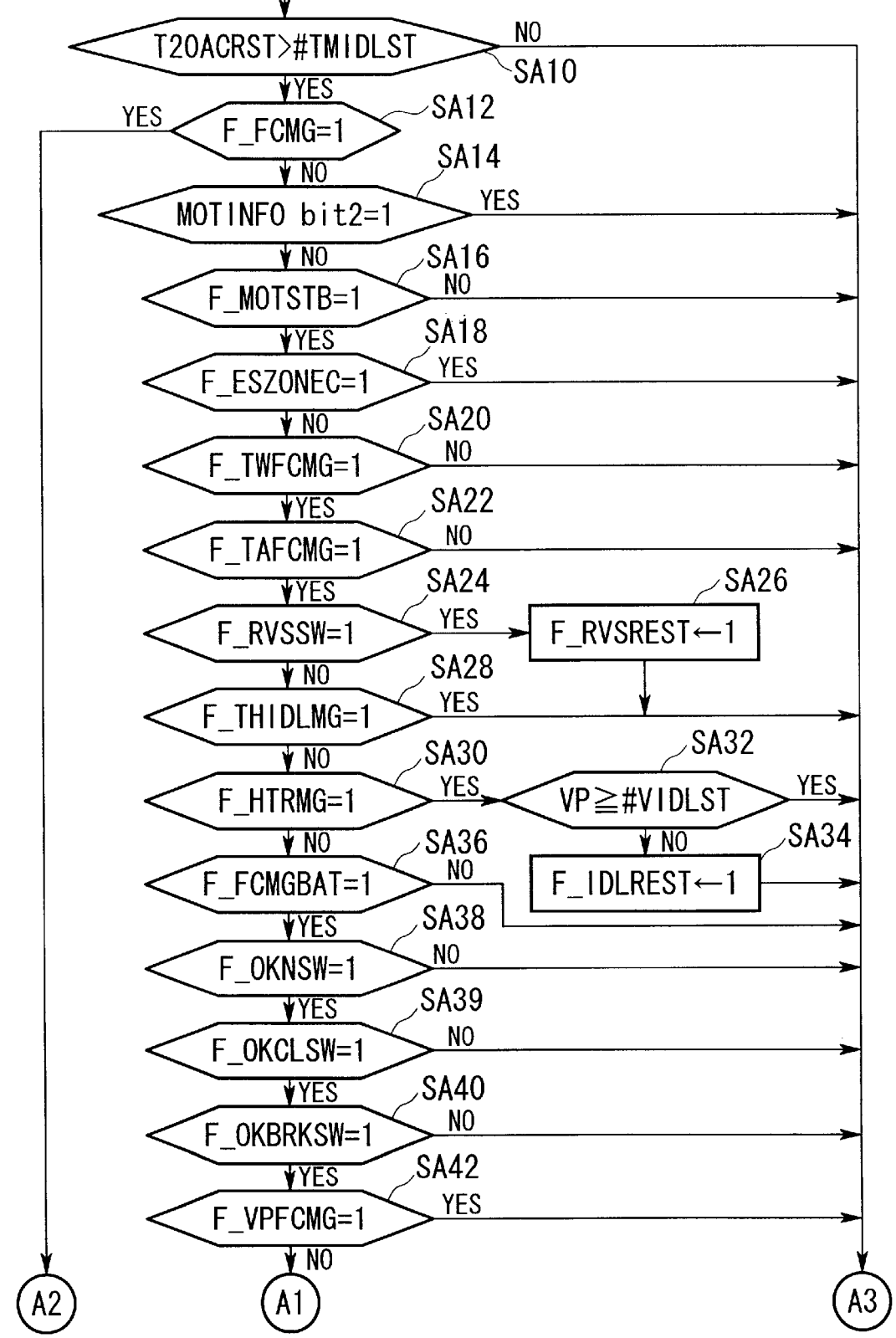
FIG. 7 is a flowchart showing a first part of an idle stop determination process in accordance with the first embodiment of the invention.
Figure 8:
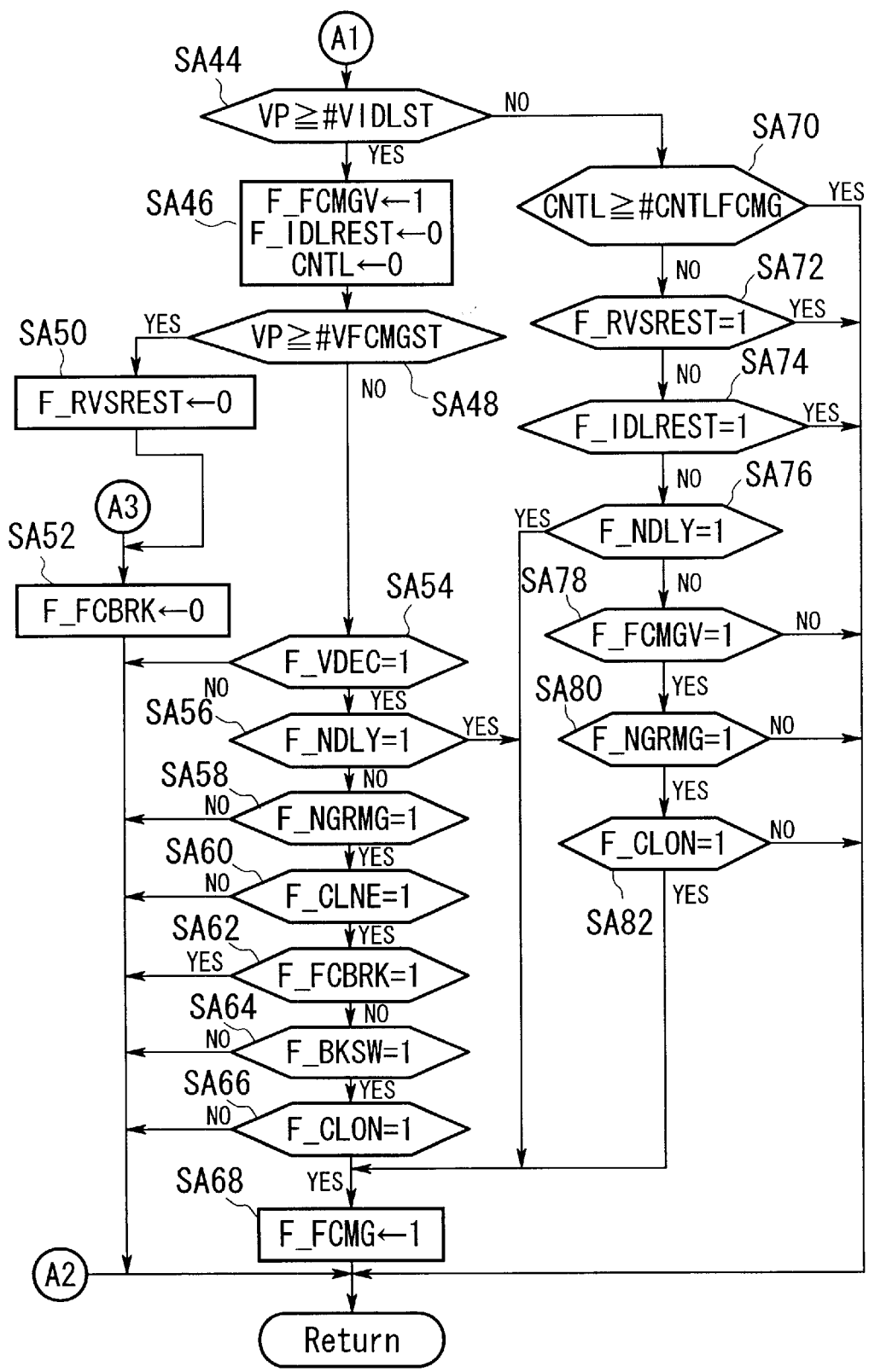
FIG. 8 is a flowchart showing a second part of the idle stop determination process in accordance with the first embodiment of the invention.

FIGS. 7 and 8 are flowcharts for determination whether to execute idle stop of the engine or not in accordance with the first embodiment of the invention. Flows (or routines) of FIGS. 7 and 8 are called from a main routine (not shown) and are executed every constant period of time, e.g., every 10 msec. Actually, steps of those flows are executed by the engine ECU 18 shown in FIG. 2. A decision whether to execute idle stop of the engine is made by a flag F_FCMG which is "1" in FIGS. 7 and 8. That is, when the flag F_FCMG is "1", the apparatus reverts control to the main routine to perform an idle stop control. If "0", the apparatus does not perform the idle stop control. Initially, the flag F_FCMG is set at "0".

When the apparatus calls the process of FIG. 7 from the main routine, the flow proceeds to step SA10 which makes a decision as to whether a prescribed time elapses from start timing to turn on a starter switch (not shown) or not. As the prescribed time, a time value of 120 seconds (i.e., two minutes) is set to a variable #TMIDLST in the step SA10. By comparison between the time value and a value of a timer T20ACRST, determination is made as to whether the prescribed time elapses from the start timing or not. The timer T20ACRST starts counting (or measuring) time when the starter switch is ON. If a decision result of the step SA10 is "NO", in other words, if the apparatus determines that the prescribed time does not elapse from the start timing to turn on the starter switch, the flow proceeds directly to step SA52 shown in FIG. 8 in which a flag F_FCBRK is set to "0". Then, the flow reverts control to the main routine. Herein, the flag F_FCBRK indicates an OFF event of the brake during deceleration F/C being continued.

If the decision result of the step SA10 is "YES", the flow proceeds to step SA12 in which a decision is made as to whether a flag F_FCMG is "1" or not. The process of FIGS. 7 and 8 are used to execute idle stop by setting the flag F_FCMG to "1". For this reason, if the flag F_FCMG has been already set to "1", the process becomes meaningless. Hence, if a decision result of the step SA12 is "YES" the flow reverts control to the main routine.

If the decision result of the step SA12 is "NO", in other words, if the flag F_FCMG is "0", the flow proceeds to step SA14.

In step SA14, a decision is made as to whether a second bit (bit 2) of a variable MOTINFO is "1" or not. The second bit of the variable MOTINFO indicates whether temperature of the battery 26 is under 0° C. or not. The battery ECU 32 sets it if the temperature is under 0C. If a decision result of the step SA14 is "YES", in other words, if the temperature of the battery 26 is under 0° C., the flow proceeds directly to step SA52 shown in FIG. 8. In step SA52, the flag F_FCBRK indicating an OFF event of the brake during the deceleration F/C being continued is set to "0". Then, the flow reverts control to the main routine.

If the decision result of the step SA14 is "NO", in other words, if the apparatus determines that the temperature of the battery 26 is higher than 0° C., the flow proceeds to step SA16.

In step SA16, a decision is made as to whether a flag F_MOTSTB is set to "1" or not. Herein, the flag F_MOTSTB indicates whether the vehicle can be started with the motor/generator 16 or not. So, the motor ECU 22 sets a value of the flag F_MOTSTB in response to states of the motor/generator 16. If a decision result of the step SA16 is "NO", the flow proceeds to the step SA52, wherein the flag F_FCBRK indicating an OFF event of the brake during the deceleration F/C being continued is set to "0". Then, the flow reverts control to the main routine.

If the decision result of the step SA16 is "YES", the flow proceeds to step SA18.

In the step SA18, a decision is made as to whether a flag F_ESZONEC is set to "1" or not. This flag F_ESZONEC is used to indicate idle stop inhibition because remaining battery charge of the battery 26 belongs to the zone $Z_B$ or $Z_C$ shown in FIG. 4B. The battery ECU 32 (see FIG. 2) sets the flag F_ESZONEC. If a decision result of the step SA18 is "YES", the apparatus does not perform idle stop of the engine. So, the flow proceeds to the step SA52, wherein the flag F_FCBRK is set to "0". Then, the flow reverts control to the main routine.

If the decision result of the step SA18 is "NO" so that the battery 26 is sufficiently charged to allow execution of the idle stop of the engine, the flow proceeds to step SA20.

In step SA20, a decision is made as to whether a flag F_TWFCMG is set to "1" or not. Herein, the flag F_TWFCMG is used to indicate whether engine water temperature is sufficiently increased to an extent that the idle stop of the engine is executed or not. The engine ECU 18 sets the flag F_TWFCMG. Determination as to whether the idle stop of the engine is executed or not is made in accordance with the aforementioned relationships between engine water temperature and outside air temperature shown in FIGS. 5A and 5B. Such determination will be described below.

The present embodiment estimates outside air temperature by measuring intake air temperature of the engine after the vehicle runs for a prescribed time. Using the estimated outside air temperature, the apparatus calculates water temperature that enables idle stop of the engine. Based on comparison between the calculated water temperature and actual engine water temperature, the engine ECU 18 sets flag F_TWFCMG to "1" or "0". Details of the aforementioned operations will be described below.

Figure 9:
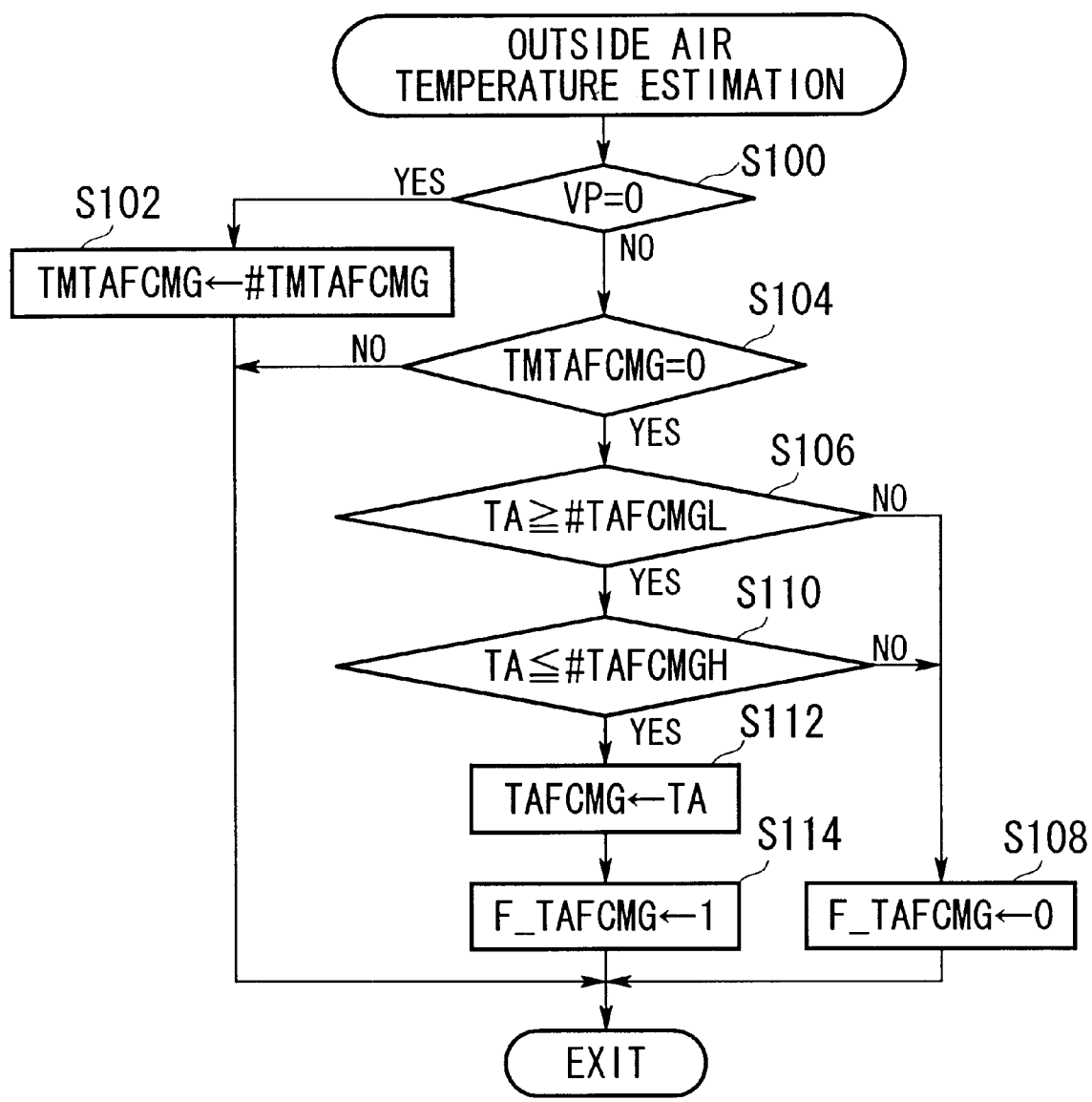
FIG. 9 is a flowchart showing a process for estimation of outside air temperature.

FIG. 9 is a flowchart showing steps for determination as to whether the estimated outside air temperature belongs to a temperature range enabling idle stop of the engine or not. The process of FIG. 9 is performed independently and in parallel with the aforementioned process of FIGS. 7 and 8. This process is performed every prescribed interval of time (e.g., 10 msec) by the engine ECU 18.

When the process of FIG. 9 is started, the flow firstly proceeds to step S100 in which a decision is made as to whether a variable VP is set to "0" or not. Herein, the variable VP stores a number of pulses which are output from the pulse generator installed in the wheel 14 within a prescribed period of time. Namely, the variable VP indicates running speed of the vehicle. That is, the step S100 makes determination as to whether the vehicle is stopped or not on the basis of the variable VP. If a decision result of the step S100 is "YES", the flow proceeds to step S102, wherein the engine ECU 18 substitutes a variable TMTAFCMG for the variable #TMTAFCMG. Herein, the variable TMTAFCMG is used to make determination as to whether a prescribed time elapses after the vehicle start running. So, a value set to the variable TMTAFCMG is subjected to subtraction in response to a lapse of time. In addition, the variable #TMTAFCMG stores the value which is set to the variable TMTAFCMG. In short, the step S102 is used for initial setting of the variable TMTAFCMG. After completion of the step S102, the flow reverts control to the main routine.

If the decision result of the step S100 is "NO", in other words, if the apparatus determines that the vehicle is running, the flow proceeds to step S104. In step S104, a decision is made as to whether the variable TMTAFCMG is set to "0" or not, in other words, a decision is made as to whether the prescribed time elapses after the vehicle starts running. If a decision result of the step S104 is "NO", the flow reverts control to the main routine. If "YES", the flow proceeds to step S106.

In step S106, a decision is made as to whether outside air temperature TA is equal to or above a variable #TAFCMGL or not, wherein the present embodiment assumes that the outside air temperature is identical to engine intake air temperature. Herein, the variable #TAFCMGL designates a lower-limit value in a temperature condition for allowing idle stop of the engine. For example, it is set to −10° C. If a decision result of the step S106 is "NO", in other words, if the apparatus determines that the outside air temperature is too low to execute the idle stop of the engine, the flow proceeds to step S108 in which a flag F_TAFCMG is set to "0". Then, the flow reverts control to the main routine. Herein, the flag F_TAFCMG is related to a temperature condition for allowance of the idle stop of the engine to be executed. If the flag F_TAFCMG is set to "1", the idle stop is allowed. If "0", the idle stop is disallowed.

If a decision result of the step S106 is "YES", the flow proceeds to step S110.

In step S110, a decision is made as to whether the outside air temperature TA is equal to or below a variable #TAFCMGH or not. Herein, the variable #TAFCMGH designates an upper-limit value of the temperature condition for allowance of the idle stop of the engine. For example, it is set to 80° C. If a decision result of the step S110 is "NO", in other words, if the apparatus determines that the outside air temperature is too high to execute the idle stop of the engine, the flow proceeds to step S108, wherein the flag F_TAFCMG is set to "0". Then, the flow reverts control to the main routine. If the decision result of the step S110 is "YES", the flow proceeds to step S112.

In step S112, the engine ECU 18 substitutes the outside air temperature TA for a variable TAFCMG. Herein, the variable TAFCMG is used for determination of engine water temperature, which is one of conditions for determination as to whether the idle stop of the engine is executed or not. After completion of the step S112, the flow proceeds to step S114 in which the flag F_TAFCMG (i.e., a temperature condition for determination as to whether idle stop of the engine is allowed or not) is set to "1". After completion of the step S114, the flow reverts control to the main routine.

Using the aforementioned variable TAFCMG which is estimated to represent the outside air temperature, the apparatus performs a process for determination as to whether the engine water temperature belongs to a water temperature range allowing idle stop of the engine or not.

Figure 10:
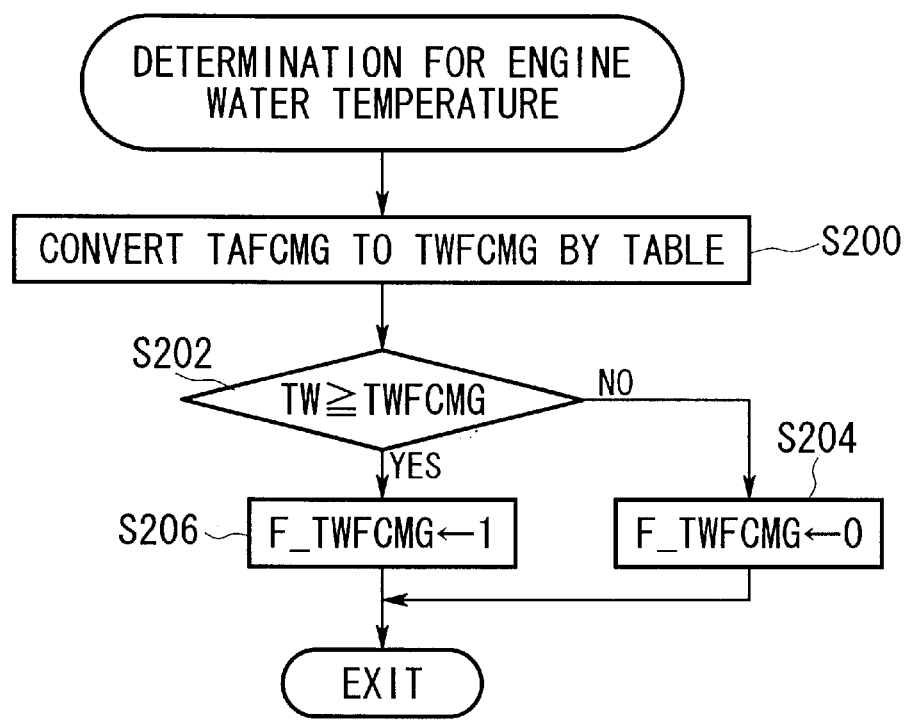
FIG. 10 is a flowchart showing a process for determination of engine water temperature.

FIG. 10 is a flowchart showing the process for determination as to whether the engine water temperature belongs to the water temperature range allowing the idle stop of the engine or not. This process is performed independently and in parallel with the foregoing processes of FIGS. 7, 8 and 9. The process of FIG. 10 is performed every prescribed interval of time (e.g., 10 msec) by the engine ECU 18.

Figure 11:
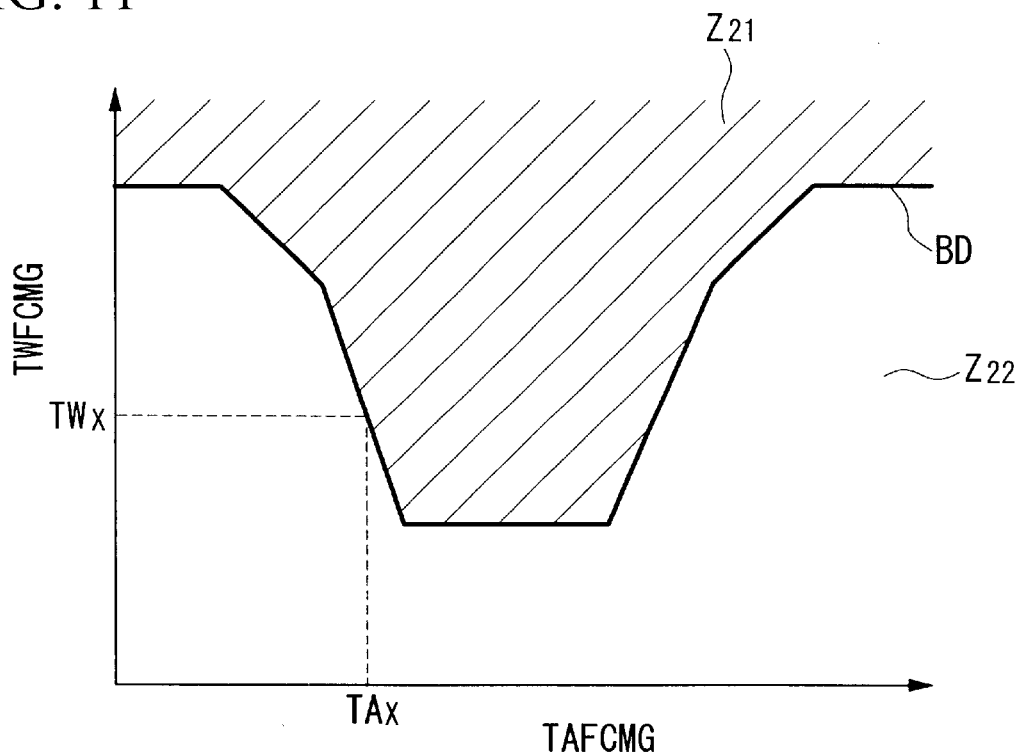
FIG. 11 is a graph showing relationships between engine water temperature and outside air temperature used for determination of idle stop of the engine.

When the process of FIG. 10 is started, the flow firstly proceeds to step S200 in which the variable TAFCMG obtained by the process of FIG. 9 is converted to a variable TWFCMG with reference to a table showing relationships between engine water temperature and outside air temperature used for determination as to whether idle stop of the engine is executed or not. Herein, the variable TWFCMG indicates engine water temperature which is one of conditions for determination as to whether the idle stop of the engine is executed or not. FIG. 11 shows content of the table storing the relationships between the engine water temperature and outside air temperature used for determination as to whether the idle stop of the engine is executed or not. FIG. 11 shows two zones, namely $Z_{21}$ and $Z_{22}$, in connection with relationships between the variables TAFCMG and TWFCMG. That is, the idle stop of the engine is allowed if those variables lie in the zone $Z_{21}$. The idle stop of the engine is inhibited if those variables lie in the zone $Z_{22}$. Boundaries between the zones $Z_{21}$ and $Z_{22}$ vary in accordance with a curve BD to actualize the aforementioned idle stop controls shown in FIGS. 5A and 5B. In the process of FIG. 10, conversion is carried out such that the variable TWFCMG is set to TWx when the variable TAFCMG is set to Tax in FIG. 11.

After completion of the step S200 which produces an engine water temperature TW, the flow proceeds to step S202 in which a decision is made as to whether the engine water temperature TW is equal to or above the variable TWFCMG or not. This step is used to determine whether the engine water temperature belongs to the zone $Z_{21}$ shown in FIG. 11 or not. If a decision result of the step S202 is "NO", the flow proceeds to step S204 in which the flag F_TWFCMG is set to "0". Idle stop of the engine is allowed when the flag F_TWFCMG is set to "1", while idle stop of the engine is disallowed when the flag F_TWFCMG is set to "0". After completion of the step S204, the flow reverts control to the main routine.

If the decision result of the step S202 is "YES", the flow proceeds to step S206 in which the flag F_TWFCMG is set to "1".

In FIG. 7, if a decision result of the step SA20 is "NO", the flow proceeds to step SA52 in which the flag F_FCBRK indicating an OFF event of the brake during the deceleration F/C being continued is set to "0". Then, the flow reverts control to the main routine.

If the decision result of the step SA20 is "YES", the flow proceeds to step SA22 in which a decision is made as to whether the flag F_TAFCMG is set to "1" or not. If a decision result of the step SA22 is "NO", the flow proceeds to step SA52 in which the flag F_FCBRK indicating an OFF event of the brake during the deceleration F/C being continued is set to "0". Then, the flow reverts control to the main routine. If the decision result of the step SA22 is "YES", the flow proceeds to step SA24. By the aforementioned steps SA20 and SA22, it is possible to determine whether the outside air temperature and engine water temperature meet conditions for allowing the idle stop of the engine or not.

In step SA24, a decision is made as to whether a flag F_RVSSW is set to "1" or not. Herein, the flag F_RVSSW is set to "1" in a state qf where the driver puts gear to reverse, while it is set to "0" in other states. If a decision result of the step SA24 is "YES", the flow proceeds to step SA26 in which a flag F_RVSREST is set to "1". The flag F_RVSREST indicates a change of movement of the vehicle in which the vehicle originally moving forward is changed to move backward. Once the flag F_RVSREST is set to "1", it is retained until running speed of the vehicle reaches a prescribed speed. Namely, the apparatus inhibits idle stop of the engine of the vehicle which is moving backward so that the flag F_RVSREST is set to "1". After completion of the step SA26, the flow proceeds to step SA52 in which the flag F_FCBRK indicating an OFF event of the brake during the deceleration F/C being continued is set to "0". Then, the flow reverts control to the main routine. If the decision result of the step SA24 is "NO", the flow proceeds to step SA28.

In step SA28, a decision is made as to whether a flag F_THIDLMG is set to "1" or not. The flag F_THIDLMG stores a state of the acceleration pedal. So, the flag F_THIDLMG is set to "1" when the accelerator (or throttle) is full open (or when the driver depresses the acceleration pedal by his/her foot). It is set to "0" when the accelerator is full close (or when the driver does not step on the acceleration pedal). If a decision result of the step SA28 is "YES" indicating that the driver depresses the acceleration pedal, the flow proceeds to step SA52 in order to inhibit idle stop of the engine. That is, the flag F_FCBRK indicating an OFF event of the brake during the deceleration F/C being continued is set to "0". Then, the flow reverts control to the main routine.

If the decision result of the step SA28 is "NO", the flow proceeds to step SA30.

In step SA30, a decision is made as to whether a flag F_HTRMG is set to "1" or not. The flag F_HTRMG stores an idle stop inhibition signal output from the air conditioner. So, the flag F_HTRMG is set to "1" when idle stop of the engine is inhibited, while it is set to "0" when idle stop of the engine is allowed. If a decision result of the step SA30 is "YES", the flow proceeds to step SA32.

In step SA32, a decision is made as to whether the variable VP representing running speed of the vehicle is equal to or above a variable #VIDLST or not. As described before, the variable VP designates a number of pulses which are produced in response to the running speed of the vehicle. Therefore, the step SA32 is used to determine whether the running speed of the vehicle is equal to or above a prescribed speed or not. If a decision result of the step SA32 is "YES", the flow proceeds to step SA52, then, the flow reverts control to the main routine. If "NO", the flow proceeds to step SA34 in which a flag F_IDLREST is set to "1". The flag F_IDLREST is used to inhibit idle stop of the engine when the vehicle is stopped. Due to the steps SA32 and SA34, idle stop of the engine is inhibited by the air conditioner until the vehicle starts running. After completion of the step SA34, the flow proceeds to step SA52, then, the flow reverts control to the main routine.

If the decision result of the step SA30 is "NO", the flow proceeds to step SA36 in which a decision is made as to whether a flag F_FCMGBAT is set to "1" or not. Herein, the flag F_FCMGBAT is set to "1" when remaining battery charge of the battery 26 belongs to the zone $Z_1$ shown in FIG. 4A, while it is set to "0" when the remaining battery charge does not belong to the zone $Z_1$. Incidentally, the flag F_FCMGBAT is set by the battery ECU 32. If a decision result of the step SA36 is "NO", the flow proceeds to step SA52, then, the flow reverts control to the main routine. If "YES", the flow proceeds to step SA38.

In step SA38, a decision is made as to whether a flag F_OKNSW is set to "1" or not. In step SA39, a decision is made as to whether a flag F_OKCLSW is set to "1" or not. In step SA40, a decision is made as to whether a flag F_OKBRKSW is set to "1" or not. Herein, the flag F_OKNSW indicates ON/OFF of neutral gear, the flag F_OKCLSW indicates ON/OFF of the clutch pedal, and the flag F_OKBRKSW indicates ON/OFF of the brake pedal. Those flags are set in consideration of the engine speed, running speed of the vehicle, and gear shift. If any one of decision results of the steps SA38, SA39 and SA40 is "NO", the flow proceeds to step SA52, then, the flow reverts control to the main routine. Only when all of the decision results of the steps SA38 to SA40 are "YES", the flow proceeds to step SA42.

In step SA42, a decision is made as to whether a flag F_VPFCMG is set to "1" or not. The flag F_VPFCMG is set to "1" when an error occurs in pulses generated by the pulse generator which is installed in the wheel 14. Consider that the pulse generator normally generates one hundred pulses per second. In that case, if the pulse generator stops generating pulses at a certain moment of time, the apparatus determines that an error occurs on the pulse generator, so the flag F_VPFCMG is set to "1". If a decision result of the step SA42 is "YES", the flow proceeds to step SA52, then, the flow reverts control to the main routine. If "NO", the flow proceeds to step SA44 shown in FIG. 8.

In step SA44, a decision is made as to whether the variable VP storing running speed of the vehicle is equal to or above the variable #VIDLST storing the prescribed speed (e.g., 3 km/h) or not. The flow blanches two ways in response to a decision result of the step SA44. If the decision result of the step SA44 is "YES", the flow proceeds to a sequence of steps starting from step SA46 to determine whether to perform deceleration F/C or not. If "NO", the flow proceeds to another sequence of steps starting from step SA70 to determine whether to allow idle stop of the engine or not.

Concretely speaking, if the decision result of the step SA44 is "YES", in other words, if the running speed of the vehicle reaches the prescribed speed or more and the apparatus determines that the vehicle starts running, the flow proceeds to step SA46 to start determination as to whether deceleration F/C is continued or not. That is, in step SA46, a flag F_FCMGV is set to "1", the flag F_IDLREST indicating inhibition of idle stop of the engine when the vehicle is stopped is set to "0", and a variable CNTL is set to "0". The flag F_FCMGV is set to "1" when the running speed of the vehicle is once increased high. In other words, this flag indicates an event in which the vehicle starts running at once. Since the step SA44 determines that the vehicle starts running, the flag F_FCMGV is set to "1" in the step SA46. The variable CNTL stores a count value of restarts of the vehicle, wherein restart of the vehicle is detected in response to an in-gear state.

In step SA48, a decision is made as to whether the variable VP representing the running speed of the vehicle is equal to or above a variable #VFCMGST storing a prescribed speed (e.g., 30 km/h) or not. If a decision result of the step SA48 is "YES", the flow proceeds to step SA50 in which the flag F_RVSREST indicating backward movement of the vehicle is set to "0". After completion of the step SA50, the flow proceeds to step SA52 in which the flag F_FCBRK indicating an OFF event of the brake during deceleration F/C being continued is set to "0". Then, the flow reverts control to the main routine.

If the decision result of the step SA48 is "NO", the flow proceeds to step SA54 in which a decision is made as to whether deceleration F/C is continued or not. That is, the step SA54 makes a decision as to whether a flag F_VDEC is set to "1" or not. This flag is set to "1" when deceleration is equal to or above a prescribed value (e.g., 0.05 G). If a decision result of the step SA54 is "NO", namely, if it is determined that the vehicle is not decelerating, the flow reverts control to the main routine. If "YES", the flow proceeds to step SA56.

In step SA56, a decision is made as to whether a flag F_NDLY is set to "1" or not. The flag F_NDLY is set to "1" unless deviation of running speed of the vehicle does not exceed a prescribed value. If a decision result of the step SA56 is "YES", the flow proceeds to step SA68 in which the flag F_FCMG is set to "1". Then, the flow reverts control to the main routine, so that idle stop of the engine is executed.

If the decision result of the step SA56 is "NO", the flow proceeds to steps SA58 to SA66 to make decisions as to whether flags F_NGRMG, F_CLNE, F_FCBRK, F_BKSW and F_CLON are respectively set to "1" or not. Herein, the flag F_NGRMG is set to "1" when the driver selects gears other than the first gear. The flag F_CLNE is set to "1" if the engine speed is under a prescribed value (e.g., 1000 rpm) when the driver steps on the clutch pedal. The flag F_FCBRK indicates an OFF event of the brake during deceleration F/C being continued. The flag F_BKSW indicates that the driver presently depresses the brake pedal by his/her foot. The flag F_CLON is set to "1" when the clutch is ON.

If a decision result of the step SA62 is "YES" or if any one of decision results of the steps SA58, SA60, SA64 and SA66 is "NO", the flow reverts control to the main routine. If the decision result of the step SA62 is "NO" and all the decision results of the steps SA58, SA60, SA64 and SA66 are "YES", the flow proceeds to step SA68 in which the flag F_FCMG is set to "1". Then, the flow reverts control to the main routine, so that idle stop of the engine is executed.

If the decision result of the step SA44 is "NO", in other words, if running speed of the vehicle does not reach the prescribed speed or more, the flow proceeds to step SA70 so as to start an idle stop determination process. In step SA70, a decision is made as to whether the variable CNTL is equal to or above a variable #CNTLFCMG or not. Herein, the variable CNTL stores a count value of restarts of the vehicle, wherein restart of the vehicle is detected in response to an in-gear state. For example, the variable #CNTLFCMG is set to "2". If a decision result of the step SA70 is "YES", the flow reverts control to the main routine.

If the decision result of the step SA70 is "NO", the flow proceeds to step SA72. In step SA72, a decision is made as to whether the flag F_RVSREST is set to "1" or not. The flag F_RVSREST indicates a change of movement of the vehicle in which the vehicle moving forward is changed to move backward. If a decision result of the step SA72 is "YES", the flow reverts control to the main routine. If "NO", the flow proceeds to step SA74 in which a decision is made as to whether the flag F_IDLREST is set to "1" or not. The flag F_IDLREST designates inhibition of idle stop of the engine when the vehicle is stopped. If a decision result of the step SA74 is "YES", the flow reverts control to the main routine. If "NO", the flow proceeds to step SA76.

In step SA76, a decision is made as to whether the flag F_NDLY is set to "1" or not. The flag F_NDLY is set to "1" if the driver continues selecting the neutral gear for a certain time. If a decision result of the step SA76 is "YES", the flow proceeds to step SA68 in which the flag F_FCMG is set to "1". Then, the flow reverts control to the main routine, so that idle stop of the engine is executed.

If the decision result of the step SA76 is "NO", the apparatus executes a series of steps starting from step SA78.

In step SA78, a decision is made as to whether the flag F_FCMGV indicating that the vehicle starts running at once is set to "1" or not. In step SA80, a decision is made as to whether the flag F_NGRMG is set to "1" or not. In step SA82, a decision is made as to whether the flag F_CLON indicating an ON event of the clutch is set to "1" or not.

If any one of decision results of the steps SA78, SA80 and SA82 is "NO", the flow reverts control to the main routine. If all the decision results are "YES", the flow proceeds to step SA68 in which the flag F_FCMG indicating allowance of idle stop of the engine is set to "1". Then, the flow reverts control to the main routine, so that idle stop of the engine is executed.

By the aforementioned steps, the apparatus determines whether to execute the idle stop of the engine or not.

Next, a detailed description will be given with respect to a process for determination as to whether the engine 10 in an idle stop mode is restarted or not.

Figure 12:
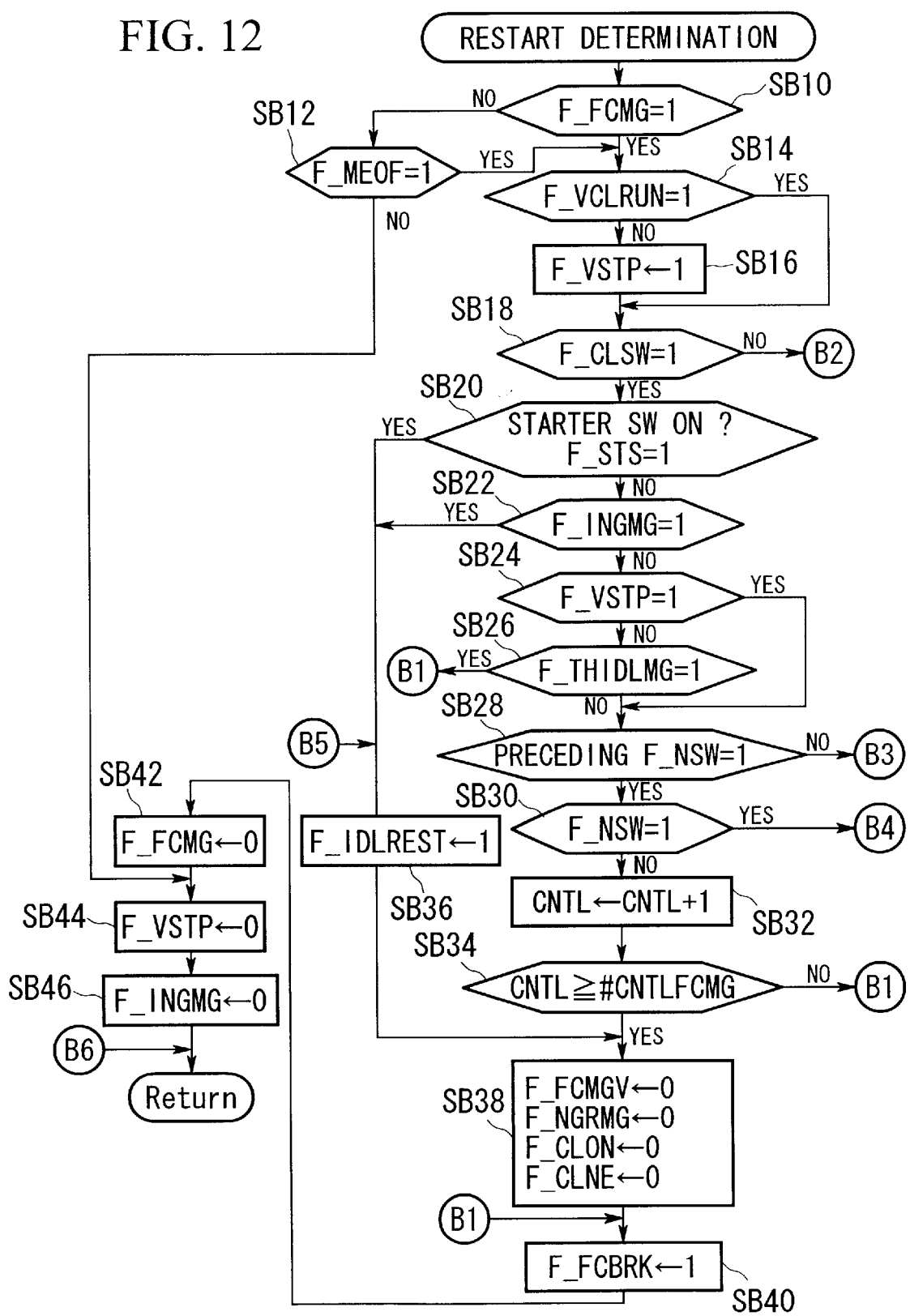
FIG. 12 is a flowchart showing a first part of an engine restart determination process in accordance with the first embodiment of the invention.
Figure 13:
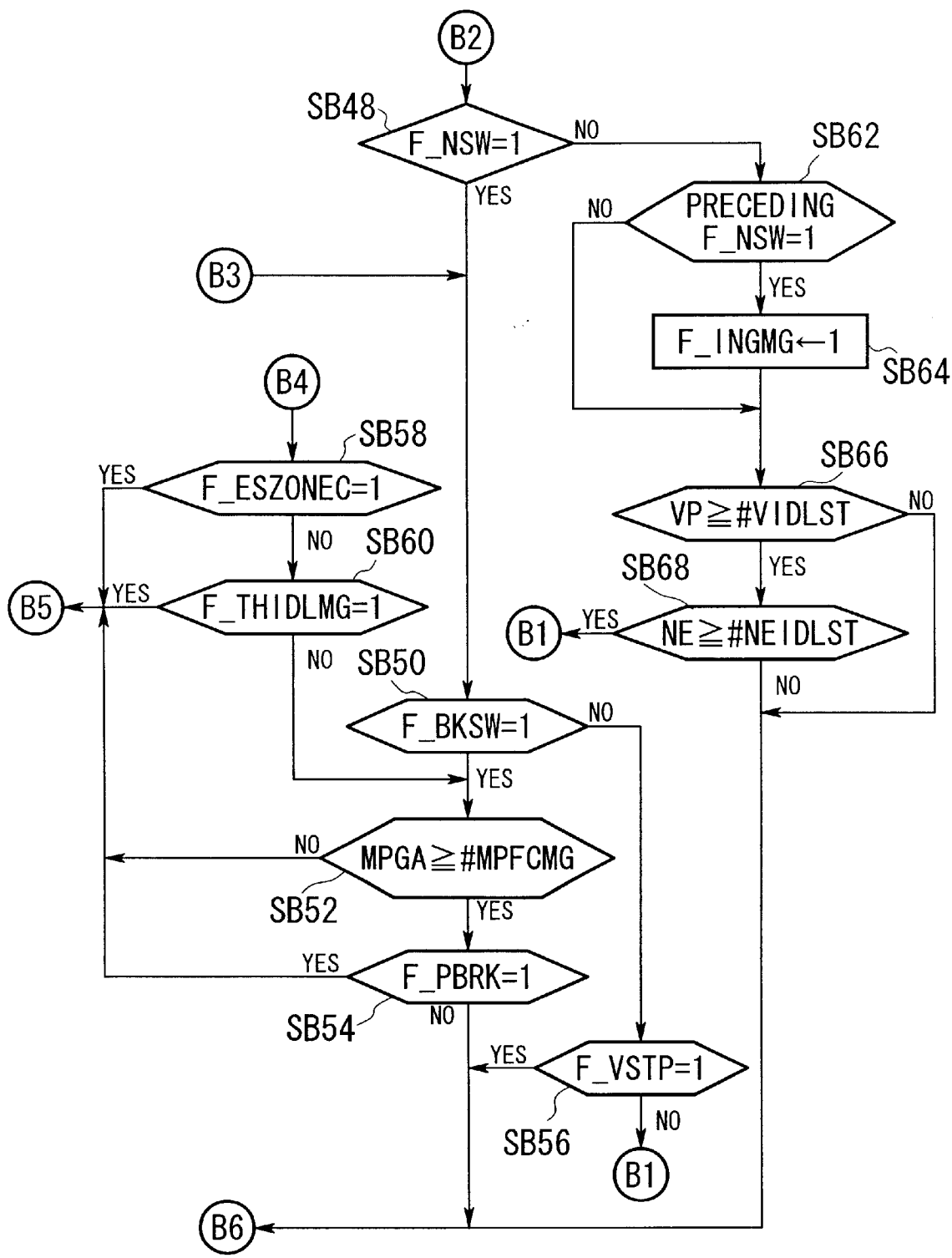
FIG. 13 is a flowchart showing a second part of the engine restart determination process in accordance with the first embodiment of the invention.

FIGS. 12 and 13 show an engine restart determination process, in which determination is made as to whether the engine 10 is restarted or not, in accordance with the first embodiment of the invention. The apparatus calls a flow of FIGS. 12 and 13 to be executed every prescribed time (e.g., 10 msec) from the main routine. Specifically, the engine ECU 18 (see FIG. 2) performs steps of the flow of FIGS. 12 and 13. Determination whether to restart the engine is realized by setting the flag F_FCMG to "0" in FIGS. 12 and 13. In the aforementioned flow of FIGS. 7 and 8, the idle stop determination process is performed by setting the flag F_FCMG to "1". In the flow of FIGS. 12 and 13, the engine restart determination process is initiated by changing the flag F_FCMG from "1" to "0".

When the apparatus calls the flow of FIG. 12 to be executed from the main routine, the flow firstly proceeds to step SB10 in which a decision is made as to whether the flag F_FCMG is set to "1" or not. This step is required for the process of FIGS. 12 and 13 to change the flag F_FCMG from "1" to "0". That is, this step is provided to prevent the apparatus from unnecessarily executing steps if the flag F_FCMG has been already set to "0" when the process is started. If a decision result of the step SB10 is "NO", the flow proceeds to step SB12.

In step SB12, a decision is made as to whether a flag F_MEOF is set to "1" or not. The flag F_MEOF is set to "1" when engine speed is zero. That is, this step is used to make engine stop determination. Concretely speaking, if the flag F_FCMG is set to "0", it is estimated that the engine is running because idle stop of the engine is inhibited. In that case, a decision result of the step SB12 is "NO", so that the flow proceeds to step SB44 in which a flag F_VSTP is set to "0". Then, in step SB46, a flag F_INGMG is set to "0". Thereafter, the flow reverts control to the main routine. Incidentally, the flags F_VSTP and F_INGMG will be described later.

The step SB12 determines that an engine stop occurs if the flag F_MEOF is set to "1" so that the engine speed is zero under inhibition of idle stop of the engine. In that case, the decision result of the step SB12 is "YES", so the apparatus performs the engine restart determination process. Specifically, the flow proceeds to step SB14. The aforementioned situation where the engine speed becomes zero under inhibition of idle stop of the engine is caused by a careless operation of the driver who stops the vehicle in an in-gear state, for example. Hence, it is necessary to make a preparation to start the vehicle by automatic idle stop or restart of the engine.

In step SB14, a decision is made as to whether a flag F_VCLRUN is set to "1" or not. The flag F_VCLRUN indicates whether the wheel 14 rotates or not. That is, the flag F_VCLRUN is set to "1" when the wheel 14 rotates. If a decision result of the step SB14 is "YES", the flow proceeds to step SB18. If "NO", the flow proceeds to step SB16 in which the flag F_VSTP is set to "1". Herein, the flag F_VSTP indicates whether the vehicle is stopped or not. That is, it is set to "1" when the vehicle is stopped. With reference to the flag F_VSTP, it is possible to monitor whether the vehicle is stopped or not in the past, and it is possible to monitor a number of times the vehicle is stopped in the past.

In step SB18, a decision is made as to whether a flag F_CLSW is set to "1" or not. The flag F_CLSW indicates whether the clutch is placed in a disengagement condition or not, in other words, whether the driver depresses the clutch pedal by his/her foot or not. So, the flag F_CLSW is set to "1" under the disengagement condition of the clutch. If a decision result of the step SB18 is "YES", the flow proceeds to step SB20 in which a decision is made as to whether the starter switch is ON or not. If a decision result of the step SB20 is "NO", the flow proceeds to step SB36 in which the flag F_IDLREST indicating inhibition of idle stop of the engine when the vehicle is stopped is set to "1". This step is provided to inhibit the idle stop of the engine from being executed until the flag F_IDLREST is reset to "0" when the vehicle starts running. After completion of the step SB36, the flow proceeds to step SB42 by way of steps SB38 and SB40. In step SB42, the flag F_FCMG is set to "0". After completion of the step SB42, the flow proceeds to steps SB44 and SB46 in series, then, the flow reverts control to the main routine. Thus, the apparatus controls the engine 10 to restart.

If the decision result of the step SB20 is "NO", the flow proceeds to step SB22 in which a decision is made as to whether a flag F_INGMG is set to "1" or not. Herein, the flag F_INGMG indicates whether the driver performs an in-gear operation or not under an engagement condition of the clutch where the clutch is engaged (or the driver leaves his/her foot from the clutch pedal) while the driver puts gear to neutral. When the driver performs the aforementioned operation, the flag F_INGMG is set to "1". If a decision result of the step SB22 is "YES", the flow proceeds to step SB36 in which the flag F_IDLREST indicating inhibition of idle stop of the engine when the vehicle is stopped is set to "1".

By the steps SB22 and SB36, the flag F_IDLREST indicating inhibition of the idle stop of the engine is set to "1" when the starter switch is not ON so that the driver establishes an in-gear state after leaving from the neutral gear while the driver does not step on the clutch pedal. The basic design concept for the idle stop and restart of the engine is to start the engine when the driver makes a gear change while depressing the clutch pedal. To start the vehicle in a hurry, the driver does not always recognize which of depression of the clutch pedal and establishment of the in-gear state is made first. Actually, the driver selects the in-gear state before depressing the clutch pedal. So, if the driver recognizes that the in-gear state is established after depression of the clutch pedal, the engine does not start well. In that case, the driver considers that an engine trouble occurs. The steps SB22 and SB36 are provided to improve drivability and manual operation to handle the vehicle in order to cope with the aforementioned situation. That is, the present embodiment ensures that the engine is restarted when the driver depresses the clutch pedal again.

If the decision result of the step SB22 is "NO", the flow proceeds to step SB24 in which a decision is made as to whether the flag F_VSTP is set to "1" or not. Herein, the flag F_VSTP indicates whether the vehicle is stopped or not. If a decision result of the step SB24 is "NO", the flow proceeds to step SB26. When the decision result of the step SB24 is "NO", it is assumed that the vehicle has no history of being stopped when the driver depresses the clutch pedal, in other words, the vehicle runs by inertia. In step SB26, a decision is made as to whether the flag F_THIDLMG representing a state of the acceleration pedal is set to "1". If a decision result of the step SB26 is "YES", in other words, if the driver depresses the acceleration pedal, the flow proceeds to step SB40 in which the flag F_FCBRK indicating an OFF event of the brake during deceleration F/C being continued is set to "1". In step SB42, the flag F_FCMG is set to "0". After completion of the step SB42, the flow proceeds to steps SB44 and SB46, then, the flow reverts control to the main routine, so that the apparatus controls the engine 10 to restart. In short, when the driver depresses the acceleration pedal when the vehicle runs by inertia, the engine is automatically restarted.

If the decision result of the step SB26 is "NO", in other words, if the vehicle has a history of being stopped or if the vehicle runs by inertia but the driver does not depress the acceleration pedal, the flow proceeds to step SB28 in which a decision is made as to whether the flag F_NSW is previously set to "1" in a preceding cycle or not. The flag F_NSW indicates whether the driver puts gear to neutral or not. In the case of the neutral gear, the flag F_NSW is set to "1". If a decision result of the step SB28 is "YES", the flow proceeds to step SB30 in which a decision is made as to whether the flag F_NSW is presently set to "1" in a present cycle or not. If so, the flow proceeds to step SB32. The flow sequentially proceeds to steps SB28, SB30 and SB32 when the driver depresses the clutch pedal to establish an in-gear state. That is, the apparatus performs basic controls for idle stop and restart of the engine, so that the engine is started when the driver depresses the clutch pedal to make a gear change.

In step SB32, the variable CNTL storing a count value of restarts of the vehicle is incremented. In step SB34, a decision is made as to whether the variable CNTL is equal to or above the variable #CNTLFCMG or not. For example, the variable #CNTLFCMG is set to "2".

If a decision result of the step SB34 is "YES", the flow proceeds to step SB38 in which all of flags F_FCMGV, F_NGRMG, F_CLON and F_CLNE are set to "0". Herein, the flag F_FCMGV indicates that the vehicle starts running at once, the flag F_NGRMG indicates that the driver uses gears other than the first gear, the flag F_CLON indicates that the clutch is ON, and the flag F_CLNE indicates that engine speed is under a prescribed value. After completion of the step SB38, or if the decision result of the step SB34 is "NO", the flow proceeds to step SB40.

In step SB40, the flag F_FCBRK indicating an OFF event of the brake during deceleration F/C being continued is set to "1".

After completion of the step SB40, the flow proceeds to step SB42 in which the flag F_FCMG indicating restart of the engine is set to "0". So, the flow sequentially proceeds to steps SB44 and SB46, then, the flow reverts control to the main routine, so that the apparatus controls the engine to restart.

If both of the decision results of the steps SB28 and SB30 are "YES", in other words, if the driver selects the neutral gear in both of the preceding cycle and present cycle, the flow proceeds to step SB58 (see FIG. 13). In step SB58, a decision is made as to whether the flag F_ESZONEC is set to "1" or not. If a decision result of the step SB58 is "YES", in other words, if remaining battery charge of the battery 26 belongs to the foregoing zone $Z_B$ or $Z_C$ shown in FIG. 4B so that idle stop of the engine is inhibited, the flow proceeds to step SB36 (see FIG. 12) in which the flag F_IDLREST indicating inhibition of the idle stop of the engine when the vehicle is stopped is set to "1". So, the flow sequentially proceeds to steps SB38 and SB40, then, the flow proceeds to step SB42 in which the flag F_FCMG is set to "0". After completion of the step SB42, the flow proceeds to steps SB44 and SB46, then, the flow reverts control to the main routine, so that the apparatus controls the engine 10 to restart.

If the decision result of the step SB58 is "NO", the flow proceeds to step SB60 in which a decision is made as to whether the flag F_THIDLMG representing a state of the acceleration pedal is set to "1" or not. If a decision result of the step SB60 is "YES" the flow proceeds to the aforementioned steps which the flow proceeds when the decision result of the step SB58 is "YES".

If the decision result of the step SB60 is "NO", the flow proceeds to step SB52 in which a decision is made as to whether a variable MPGA is equal to or above a variable #MPFCMG or not. The variable MPGA stores a value representative of master power negative pressure of the servo device. In addition, the variable #MPFCMG stores a value that initiates restart of the engine when reduction occur on the master power negative pressure. That is, the step SB52 is provided to secure "sufficient" negative apressure by restarting the engine to cope with an unwanted situation where the driver feels difficulty in operating the brake due to increasing reaction of the brake pedal when the master power negative pressure disappears. If a decision result of the step SB52 is "NO", the flow proceeds to the aforementioned steps which the flow proceeds when the decision result of the step SB58 is "YES".

If the decision result of the step SB52 is "NO", the flow proceeds to step SB54 in which a decision is made as to whether a variable F_PBRK is set to "1" or not. Herein, the flag F_PBRK is set to "1" if ON/OFF operations of the brake pedal are made a prescribed number of times or more. Namely, this flag indicates whether the driver performs the pumping brake technique or not. The step SB54 is provided to avoid reduction of the brake negative pressure, which is reduced if the driver frequently effects the pumping brake technique. If a decision result of the step SB54 is "YES", the flow proceeds to the aforementioned steps which the flow proceeds when the decision result of the step SB58 is "YES".

If the decision result of the step SB54 is "NO", the flow reverts control to the main routine.

Next, the engine restart determination process is started, so if the decision result of the step SB18 (see FIG. 12) is "NO" and the decision result of the step SB48 (see FIG. 13) is "YES", in other word, if the apparatus determines that the driver does not depress the clutch pedal under the neutral gear, the flow proceeds to step SB50. In addition, the flow also proceeds to step SB50 when the decision result of the step SB28 (see FIG. 12) is "NO".

In step SB50, a decision is made as to whether a flag F_BKSW indicating that the driver presently depresses the brake pedal is set to "1" or not. If a decision result of the step SB50 is "YES", the flow proceeds to step SB52, content of which is described before. If the decision result of the step SB50 is "NO", in other words, if the driver does not depress the brake pedal, the flow proceeds to step SB56 in which a decision is made as to whether the flag F_VSTP indicating whether the vehicle is stopped is set to "1" or not. If a decision result of the step SB56 is "YES", the flow reverts control to the main routine. If "NO", the flow proceeds to step SB40 (see FIG. 12), from which the flow proceeds to step SB42 in which the flag F_FCMG is set to "0". So, the flow proceeds to steps SB44 and SB46, then, the flow reverts control to the main routine, so that the apparatus controls the engine 10 to restart.

When the decision result of the step SB56 is "NO", the driver does not depress the clutch pedal nor the brake pedal under the neutral gear, and the vehicle has no history of being stopped. This situation can be interpreted such that the driver truly has an intention to run the vehicle by inertia. It is unclear whether the driver has an intention to stop the vehicle (in other words, the driver may not have an intention to stop the vehicle) while the driver runs the vehicle by inertia. In that case, the apparatus provides a flow of control from step SB56 to step SB40 in order to restart the engine for preparation of a next operation (e.g., acceleration operation).

If the engine restart determination process is started so that the decision result of the step SB18 turns to "NO", in other words, if the driver does not depress the clutch pedal, the flow proceeds to step SB48 in which a decision is made as to whether the flag F_NSW indicating whether the driver puts gear to neutral is set to "1" or not. If a decision result of the step SB48 is "NO" because the apparatus determines that an in-gear state is established, the flow proceeds to step SB62 in which a decision is made as to whether the flag F_NSW is previously set to "1" in a preceding cycle or not. That is, the apparatus determines whether the driver puts gear to neutral in the preceding cycle of processing or not. If a decision result of the step SB62 is "YES", the flow proceeds to step SB64 in which the flag F_INGMG is set to "1". Herein, the flag F_INGMG indicates whether the driver performs an in-gear operation under an engagement state of the clutch after the driver puts gear to neutral. After completion of the step SB64, the flow proceeds to step SB66. In addition, the flow also proceeds to step SB66 if the decision result of the step SB62 is "NO" so that the step SB64 is skipped.

In step SB66, a decision is made as to whether the variable VP representing running speed of the vehicle is equal to or above the variable #VIDLST storing the prescribed speed (e.g., 3 km/h) or not. If a decision result of the step SB66 is "NO", the flow reverts control to the main routine. Thus, the apparatus controls the engine not to restart because the running speed of the vehicle does not reach the prescribed speed designated by the variable #VIDLST. If the decision result of the step SB66 is "YES", the flow proceeds to step SB68 in which a decision is made as to whether the variable NE representing engine speed is equal to or above a variable #NEIDLST (e.g., 250 rpm) or not. If a decision result is "NO", the flow reverts control to the main routine.

If the decision result of the step SB68 is "YES", the flow proceeds to step SB40 (see FIG. 12) in which the flag F_FCBRK indicating an OFF event of the brake during deceleration F/C being continued is set to "1". In step SB42, the flag F_FCMG indicating restart of the engine is set to "0". So, the flow proceeds to steps SB44 and SB46, then, the flow reverts control to the main routine, so that the apparatus controls the engine to restart.

When the decision result of the step SB68 is "YES", the driver does not depress the clutch pedal in an in-gear state, and the running speed is high so that the engine speed is correspondingly high. In this case, the apparatus continues the deceleration F/C. However, if the deceleration F/C is continued so long, there may be established a push-start condition as if some person pushes the vehicle to start the engine. For example, such a push-start condition is established when the driver forces the clutch to engage under execution of idle stop of the engine while the vehicle runs with second gear by inertia. To avoid occurrence of the push-start condition, the apparatus controls the engine to restart.

[B] Second Embodiment

Next, an engine automatic start stop control apparatus will be described in accordance with a second embodiment of the invention.

Figure 14:
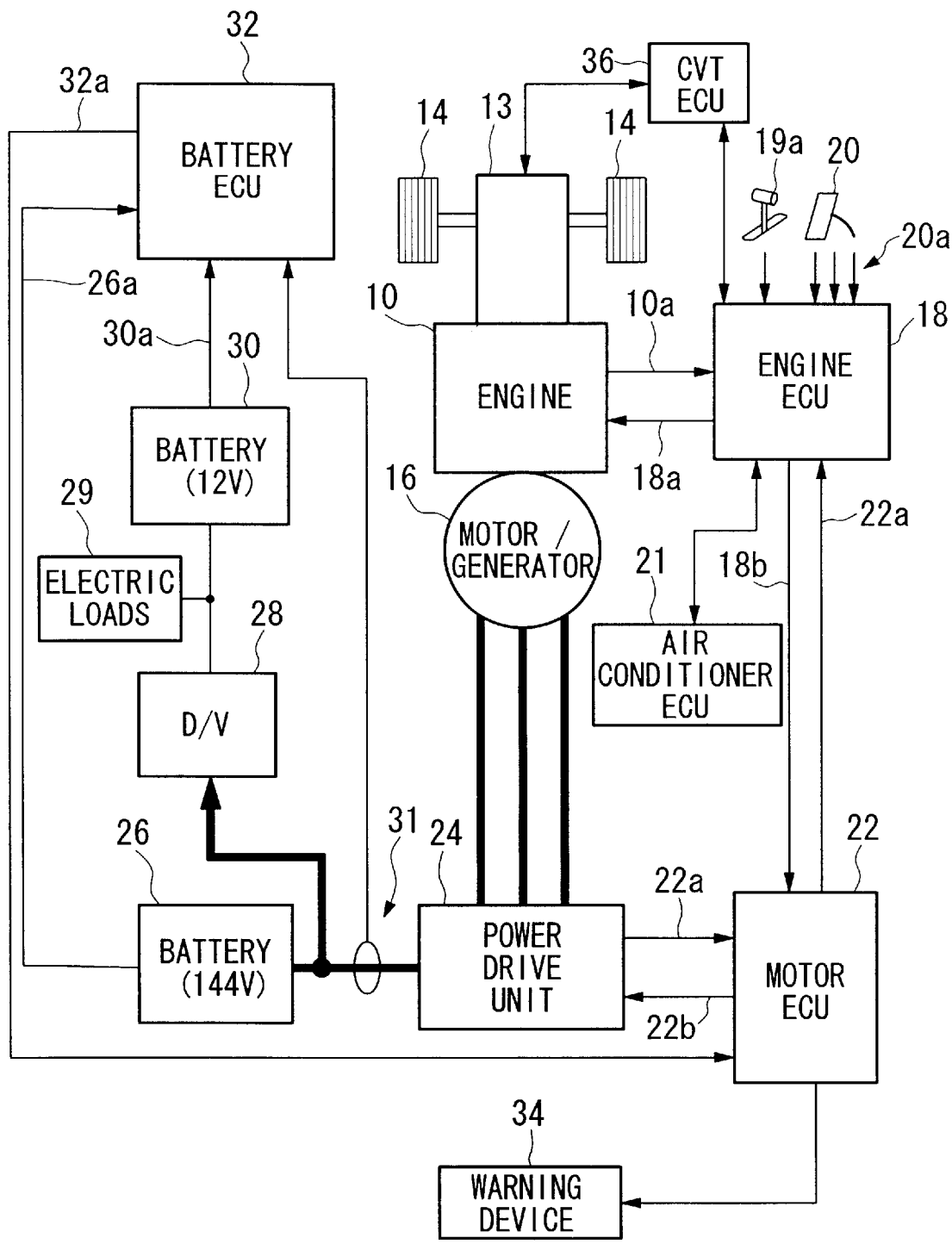
FIG. 14 is a block diagram showing a configuration of an engine automatic start stop control apparatus in accordance with a second embodiment of the invention.

FIG. 14 shows a configuration of the engine automatic start stop control apparatus of the second embodiment.

Main difference between the first embodiment (see FIG. 2) and the second embodiment is a type of the transmission. That is, the second embodiment replaces the manual transmission 12 shown in FIG. 2 with a continuously variable transmission (CVT) 13 shown in FIG. 14. In addition, the second embodiment is equipped with a CVT ECU 36 for controls of the CVT 13. The CVT ECU 36 performs communications with the engine ECU 18. Particularly, the engine ECU 18 outputs an idle stop execution request to the CVT ECU 36, so that the CVT ECU 36 monitors states of the CVT 13. Upon completion of preparation for execution of idle stop of the engine 10, the CVT ECU 36 outputs a CVT preparation completion signal to the engine ECU 18.

Next, descriptions will be given with respect to idle stop and start controls.

Like the first embodiment, the second embodiment is basically designed to perform idle stop or restart of the engine in connection with the foregoing modes (1) to (9). Thus, it is possible to reduce discharge of gas while improving drivability and manual operation to handle the vehicle. In the present specification, descriptions are given mainly with respect to technical differences between the first and second embodiments.

(1) Engine Stop During Deceleration

The engine automatic start stop control apparatus of the second embodiment controls the engine 10 to stop when the driver depresses the brake pedal by his/her foot, and the CVT ECU 36 outputs a CVT preparation completion signal to the engine ECU 18. However, when the driver jams the brake on, in other words, when the driver puts a so-called "panic brake" on, the apparatus does not perform idle stop of the engine. This is because the CVT has a restriction in mechanism such that a ratio of the CVT 13 does not return to a low ratio without a sufficient time for deceleration due to the panic brake, so the CVT ECU 36 does not output a CVT preparation completion signal. The apparatus executes idle stop of the engine when the ratio of the CVT returns to the low ratio because sufficient acceleration cannot be always obtained without the low ratio of the CVT when the vehicle starts running. In addition, the apparatus controls the engine to restart when the driver leaves his/her foot off from the brake pedal.

(2) Idle Stop of the Engine of the Vehicle Which is Stopped

The apparatus controls the engine to stop when the driver depresses the brake pedal and the CVT ECU 36 outputs a CVT preparation completion signal. In addition, the apparatus controls the engine to restart when the driver leaves his/her foot from the brake pedal. Those controls are performed independently of controls of the aforementioned mode (1). The apparatus does not control the engine in such a way that after the engine is stopped by controls of the mode (1), the engine is started and is then stopped by controls of this mode (2). That is, this mode (2) ensures that the engine is certainly stopped even if the condition of the aforementioned mode (1) is not established.

(3) Idle Stop Inhibition After Restart

This mode is provided to cope with specific brake-pedal operations in which the driver leaves his/her foot from the brake pedal to restart the engine, then, the driver depresses the brake pedal. That is, if the driver performs the aforementioned specific brake-pedal operations at one time, the apparatus allows idle stop of the engine. However, when the drive performs the specific brake-pedal operations two times or more, the apparatus inhibits idle stop of the engine until running speed of the vehicle reaches a prescribed speed (e.g., 15 km/h). In congestion, the driver frequently repeats stop-and-go operations in which the driver leaves his/her foot from the brake pedal to run the vehicle for a small distance at a low speed, then, the drive steps on the brake pedal to stop the vehicle. If such stop-and-go operations are repeated for a long time, electricity of the battery is greatly consumed. To cope with the above, the apparatus operates in principle such that idle stop of the vehicle is executed if the driver leaves his/her foot from the brake pedal to start the vehicle, then, the driver steps on the brake pedal before running speed of the vehicle does not reach the prescribed speed. However, the apparatus inhibits the idle stop of the engine from being executed if the driver leaves his/her foot from the brake pedal to start the vehicle again, then, the driver steps on the brake pedal before the running speed of the vehicle reaches the prescribed speed. To stop the vehicle equipped with the CVT 13, the driver adjusts distance between the vehicle and another vehicle ahead by repeatedly depressing and releasing the brake pedal. During execution of idle stop of the engine, there may occur a drawback in that the distance between the vehicles cannot be adjusted well because of a lack of a driving force. To avoid occurrence of such a drawback, it is necessary to secure the driving force of the vehicle by inhibiting the idle stop of the engine after restart.

The aforementioned operations are basic controls for the idle stop and restart of the engine. The present embodiment is designed to perform more precise controls, which will be described below.

(4) Sudden Acceleration Measure

The apparatus allows restart of the engine during an idle stop mode if the driver depresses the acceleration pedal to reduce remaining battery charge or the air conditioner requests the engine to restart under the condition where the driver depresses the brake pedal in the idle stop mode while the CVT 13 is neutral. Herein, the apparatus does not allow restart of the engine during the idle stop mode only if the CVT 13 is neutral in order to cope with a trouble which occurs on a neutral detection switch to normally output a neutral signal declaring that the CVT is neutral. That is, it is necessary to avoid a sudden start of the vehicle due to restart of the engine during the idle stop mode only if the CVT is neutral.

Incidentally, the second embodiment is designed similar to the first embodiment with regard to the following modes:

(5) Idle Stop Communication;

(6) Alarm Sound;

(7) Cooperation with Air Conditioner;

(8) Control Based on Detection Result of Brake Master Power Negative Pressure Sensor; and (9) Improvement of Manual Operation to Handle the Vehicle.

Figure 15A:
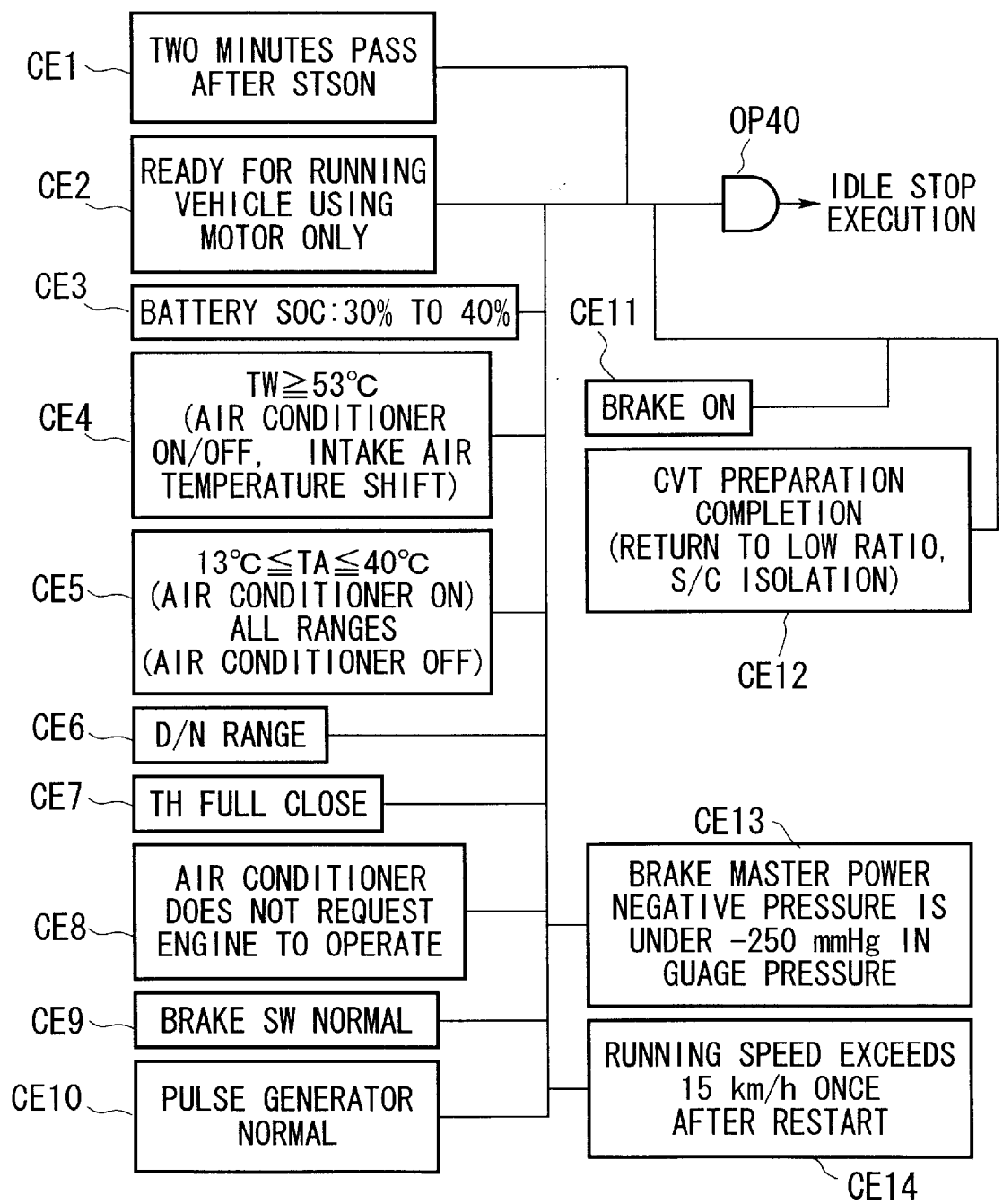
FIG. 15A is a logic diagram showing idle stop determination conditions in accordance with the second embodiment.
Figure 15B:
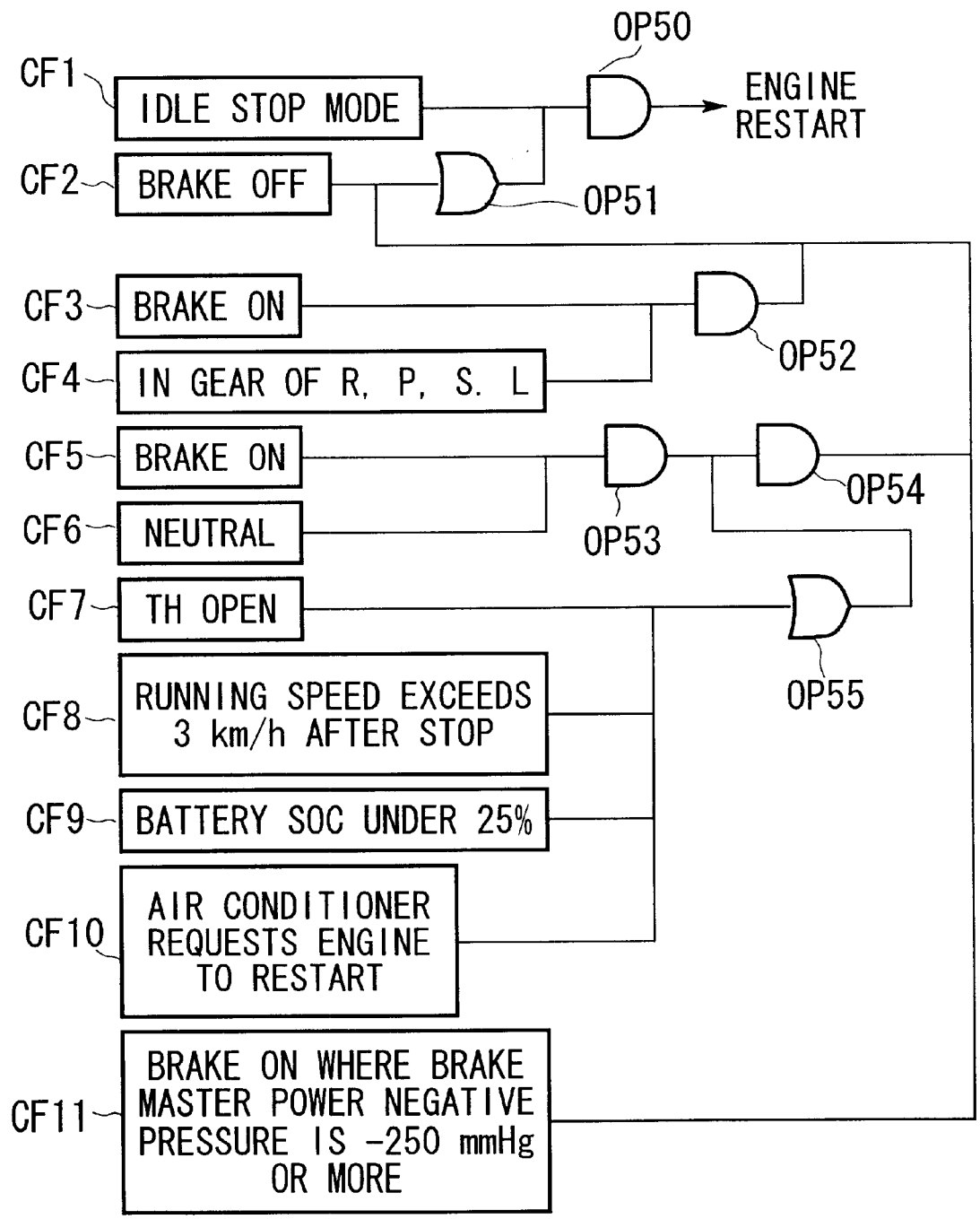
FIG. 15B is a logic diagram showing engine restart determination conditions in accordance with the second embodiment.

FIGS. 15A and 15B show outlines of idle stop determination conditions and engine restart determination conditions in accordance with the second embodiment of the invention. Specifically, FIG. 15A shows the idle stop determination conditions, and FIG. 15B shows the engine restart determination conditions.

In FIG. 15A, all of conditions CE1 to CE14 are logically connected together by an AND operator OP40. Namely, the apparatus executes idle stop of the engine only when all of the conditions CE1 to CE14 are established.

Incidentally, the conditions CE1 to CE5 are identical to the foregoing conditions CA1 to CAS shown in FIG. 3A.

The condition CE6 is exclusively provided for the second embodiment to determine whether the transmission is placed in either D range (or drive mode) or N range (or neutral mode) or not. Details in mode selection of the transmission are not discussed in the present specification. The second embodiment installs multiple control modes to change drive performance by changing controls of the CVT in response to driver's operations. Generally speaking, the D range (or drive mode) is used to perform normal driving operations, while the N range (or neutral mode) is used to stop the vehicle for a long time. Other than the D and N ranges, the transmission installs an S range (or sports mode). As compared with the D range or else, the S range (or sports mode) sets large torque for starting so as to provide high acceleration. In addition, the S range controls the vehicle such that a ratio of the CVT is increased to be higher at a high speed drive of the vehicle. Using the S range, it is possible to enhance drive performance of the vehicle.

The conditions CE7 to CE10 are roughly identical to the foregoing conditions CA7 to CA10 shown in FIG. 3A. Among them, the condition CE9 is different from the condition CA9. That is, the condition CE9 is determination as to whether the switch of the brake pedal operates normally or not.

The condition CE11 is determination as to whether the driver depresses the brake pedal by his/her foot or not. Because, idle stop of the engine of the vehicle equipped with the CVT is basically executed based on determination that the driver depresses the brake pedal by his/her foot.

The condition CE12 is determination as to whether the CVT ECU 36 outputs a CVT preparation completion signal or not. The CVT preparation completion signal represents completion of preparation of the CVT 13 to execute idle stop of the engine. In the case of the low ratio of the CVT 13, the CVT ECU 36 outputs the CVT preparation completion signal if S/C isolation is carried out. Because, the engine cannot always produce sufficient acceleration unless the CVT 13 is returned to the low ratio when the vehicle starts.

The condition CE13 is determination as to whether brake master power negative pressure becomes equal to or above a prescribed value in gauge pressure or not. For example, the prescribed value is set to −250 mmHg. This condition is used for controls of the aforementioned mode (8). The condition CE14 is determination as to whether after restart of the engine, running speed of the vehicle becomes equal to or above a prescribed value (e.g., 15 km/h) at once or not.

Next, the engine restart determination conditions under the idle stop mode will be described with reference to FIG. 15B.

In FIG. 15B, conditions CF3, CF4 are logically connected together by an AND operator OP52, conditions CF5, CF6 are logically connected together by an AND operator OP53, and conditions CF7 to CF10 are logically connected together by an OR operator OP55. Outputs of the AND operator OP53 and the OR operator OP55 are logically connected together by an AND operator OP54. A condition CF2 and an output of the AND operator OP52 as well as an output of the AND operator OP54 and a condition CF11 are logically connected together by an OR operator OP51. Further, a condition CF1 and an output of the OR operator OP51 are logically connected together by an AND operator OP50. Thus, the AND operator OP50 outputs a signal instructing restart of the engine.

The condition CF1 is identical to the foregoing condition CB1 shown in FIG. 3B. The condition CF2 is determination as to whether the driver does not depress the brake pedal by his/her foot. The condition CF3 is determination as to whether the driver depresses the brake pedal by his/her foot. Provision of the conditions CF2 and CF3 realize the basic concept in idle stop control of the vehicle equipped with the CVT 13. Namely, the apparatus executes idle stop of the engine when the driver depresses the brake pedal, while the apparatus restarts the engine when the driver leaves his/her foot from the brake pedal.

The condition CF4 is discrimination as to whether an in-gear state of the CVT 13 corresponds to an "R" (reverse) in-gear state, a "P" (parking) in-gear state, an "S" (second) in-gear state or a "L" (low) in-gear state. It is well known that unlike the manual transmission, the continuously variable transmission (CVT) is not designed to allow gear changes in a step-by-step manner, in other words, the CVT effects "linear" variations in transmission in response to running speed of the vehicle. In some case, the driver makes specific operations to intentionally set the ratio of the CVT. Setting the ratio of the CVT is listed as one condition for determination of restart of the engine.

The condition CF5 is determination as to whether the driver depresses the brake pedal by his/her foot. The conditions CF6 to CF8 are identical to the foregoing conditions CB5 to CB7 shown in FIG. 3B. The conditions CF9 to CF11 are identical to the foregoing conditions CB9 to CB11 shown in FIG. 3B.

The second embodiment sets the idle stop determination conditions and engine restart determination conditions as described above.

Next, descriptions will be given with respect to control flows actualizing the aforementioned conditions of FIGS. 15A, 15B.

Figure 16:
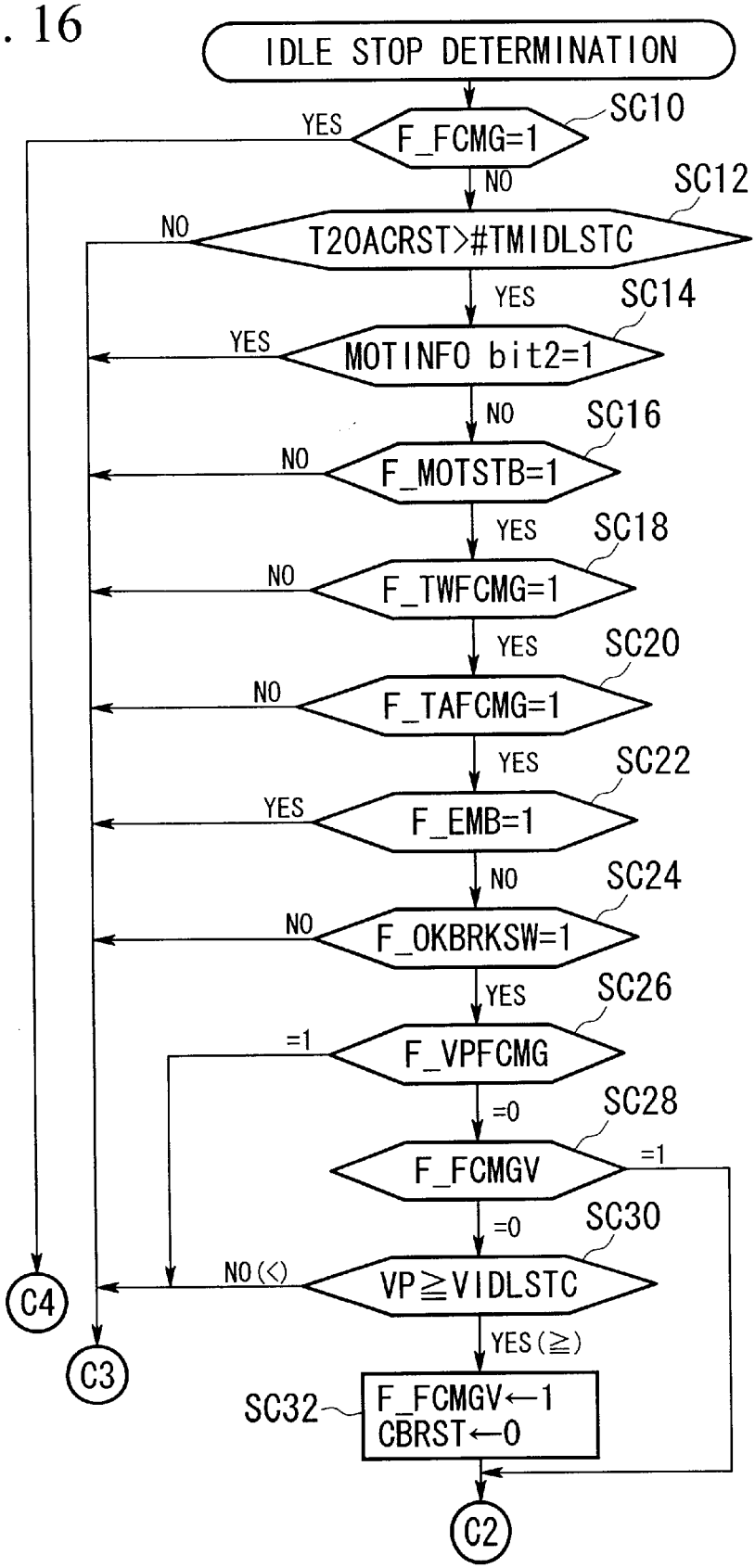
FIG. 16 is a flowchart showing a first part of an idle stop determination process in accordance with the second embodiment.
Figure 17:
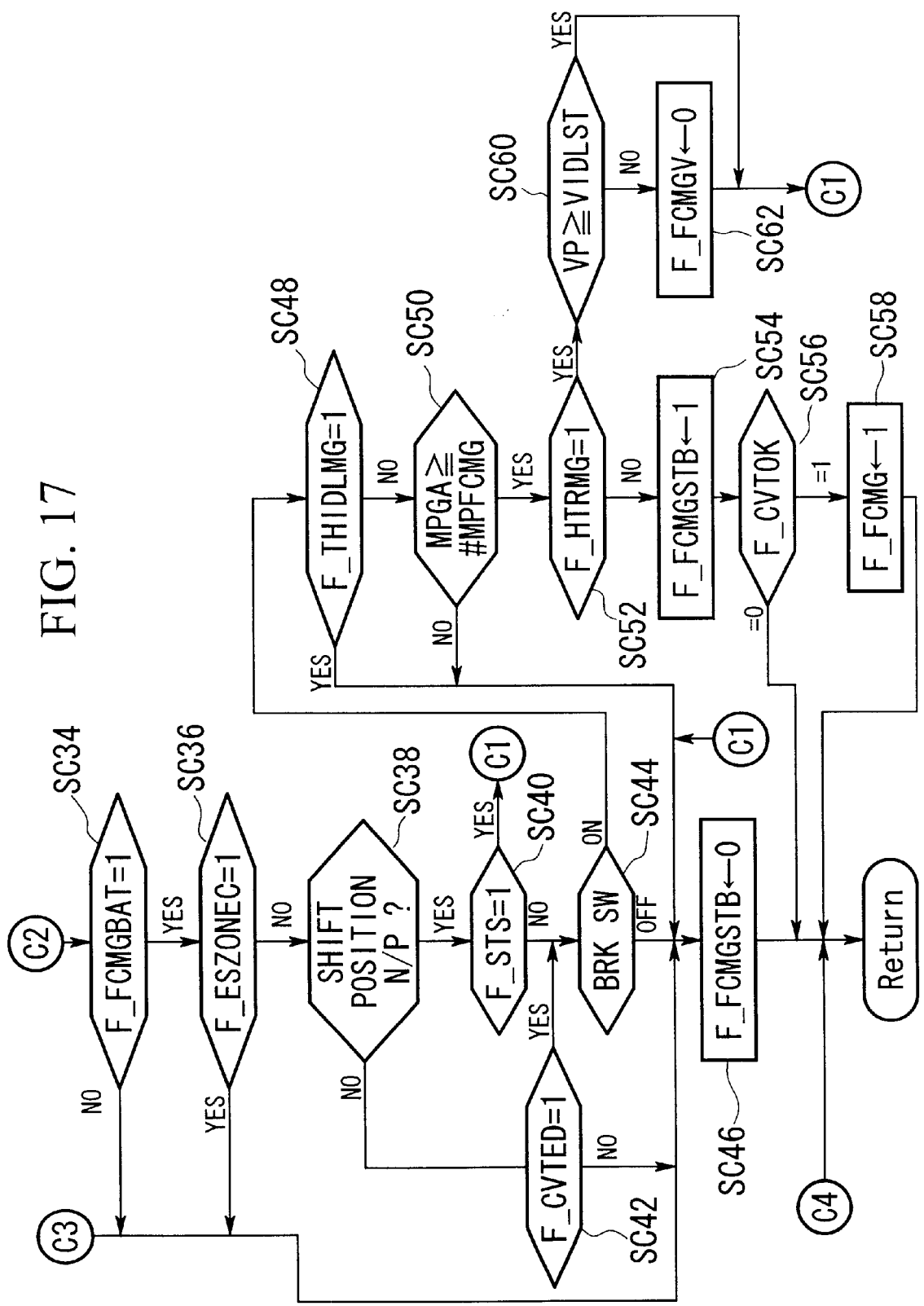
FIG. 17 is a flowchart showing a second part of the idle stop determination process in accordance with the second embodiment.

FIGS. 16 and 17 show a control flow with regard to an idle stop determination process in accordance with the second embodiment. The apparatus calls the control flow of FIGS. 16, 17 to be executed every prescribed interval of time (or every 10 msec) from the main routine (not shown). Actually, the engine ECU 18 performs steps of the control flow. Determination as to whether idle stop of the engine is executed or not is realized by a decision as to whether a flag F-FCMG shown in FIGS. 16, 17 is set to "1" or not. That is, the apparatus performs idle stop control of the engine when the flow reverts control to the main routine if the flag F_FCMG is set to "1". If the flag F_FCMG is set to "0", the apparatus does not perform the idle stop control of the engine. The flag F_FCMG is initially set to "0".

When the apparatus calls the process of FIG. 16 to be executed from the main routine, the flow firstly proceeds to step SC10 in which a decision is made as to whether the flag F_FCMG is set to "1" or not. As described above, in FIGS. 16, 17, idle stop of the engine is executed when the flag F_FCMG is set to "1". So, if the flag F_FCMG has been already set to "1" before the step SC10, its following steps are meaningless. Hence, if a decision result of the step SC10 is "YES", the flow reverts control to the main routine. If the decision result is "NO", the flow proceeds to step SC12.

In step SC12, a decision is made as to whether a prescribed time elapses from timing to turn on the starter switch or not. In step SC12, a variable #TMIDLSTC stores 120 seconds (or two minutes) as the prescribed time. By comparison between a timer value T20ACRST and the variable #TIMDLSTC, it is possible to determine whether the prescribed time elapses from the timing to turn on the starter switch. Incidentally, the time T20ACRST starts time counting when the starter switch is turned on.

If a decision result of the step SC12 is "NO", the flow proceeds to step SC46 (see FIG. 17) in which a flag F_FCMGSTB is set to "0". Then, the flow reverts control to the main routine. The flag F_FCMGSTB indicates whether the engine ECU 18 outputs an idle stop request signal to the CVT ECU 36 or not. That is, when the engine ECU 18 outputs the idle stop request signal to the CVT ECU 36, the flag F_FCMGSTB is set to "1".

If the decision result of the step SC12 is "YES", in other words, if the apparatus determines that the prescribed time of the variable #TMIDLSTC elapses from the timing to turn on the starter switch, the flow proceeds to step SC14 in which a decision is made as to whether a second bit of a variable MOTINFO is set to "1" or not. Herein, the second bit of the variable MOTINFO indicates whether the temperature of the battery 26 is under 0° C. or not. Hence, it is set in response to the temperature of the battery 26 by the battery ECU 32. If a decision result of the step SC14 is "YES", in other words, if the temperature of the battery 26 is under 0° C., the flow proceeds to step SC46 in which the flag F_FCMGSTB indicating whether the engine ECU 18 outputs an idle stop request signal to the CVT ECU 36 is set to "0". Then, the flow reverts control to the main routine.

If the decision result of the step SC14 is "NO", in other words, if the apparatus determines that the temperature of the battery 26 is higher than 0° C., the flow proceeds to step SC16.

In step SC16, a decision is made as to whether a flag F_MOTSBT is set to "1" or not. The flag F_MOTSBT indicates whether the vehicle can be started by the motor/generator 16 or not. It is set in response to a state of the motor/generator 16 by the motor ECU 22. If a decision result of the step SC16 is "NO", the flow proceeds to step SC46 in which the flag F_FCMGSTB is set to "0". Then, the flow reverts control to the main routine.

If the decision result of the step SC16 is "YES", the flow proceeds to step SC18.

In step SC18, a decision is made as to whether a flag F_TWFCMG is set to "1" or not. The flag F_TWFCMG indicates whether engine water temperature is high enough to execute idle stop of the engine or not. It is set by the engine ECU 18. Determination whether to execute idle stop of the engine is made in accordance with relationships between engine water temperature and outside air temperature shown in FIGS. 5A and 5B. Setting the aforementioned flag is made as similar to the first embodiment, which is described before with reference to FIGS. 9 to 11.

If a decision result of the step SC18 is "NO", the flow proceeds to step SC46 in which the flag F_FCMGSTB is set to "0". Then, the flow reverts control to the main routine.

If the decision result of the step SC18 is "YES", the flow proceeds to step SC20 in which a decision is made as to whether a flag F_TAFCMG is set to "1" or not. If a decision result of the step SC20 is "NO", the flow proceeds to step SC46 in which the flag F_FCMGSTB is set to "0". Then, the flow reverts control to the main routine. If the decision result of the step SC20 is "YES", flow proceeds to step SC22.

In step SC22, a decision is made as to whether a flag F_EMB is set to "1" or not. The flag F_EMB indicates whether the driver performs an emergency brake operation or not. This flag is set to "1" in the case of the emergency brake operation. Determination of the emergency brake operation is made by a decision as to whether deceleration being produced when the driver depresses the brake pedal is greater than a prescribed threshold or not. If a decision result of the step SC22 is "YES", idle stop of the engine should be inhibited to return the CVT 13 to the low ratio. So, the flow proceeds to step SC46 in which the flag F_FCMGSTB is set to "0". Then, the flow reverts control to the main routine.

If the decision result of the step SC22 is "NO", the flow proceeds to step SC24 in which a decision is made as to whether a flag F_OKBRKSW is set to "1" or not. The flag F_OKBRKSW corresponds to determination as to whether the brake is ON or OFF. In other words, the step SC24 is provided to determine whether ON or OFF is normally detected with respect to the switch of the brake pedal or not. If a decision result of the step SC24 is "NO", the flow proceeds to step SC46 in which the flag F_FCMGSTB is set to "0". Then, the flow reverts control to the main routine.

If the decision result of the step SC24 is "YES", the flow proceeds to step SC26 in which a decision is made as to whether a flag F_VPFCMG is set to "1" or not. The flag F_VPFCMG is set to "1" when an error occurs on pulses generated by the pulse generator installed in the wheel 14. For example, in the case where the pulse generator normally generates one hundred pulses per second during running of the vehicle, when a number of pulses output from the pulse generator becomes zero at a certain moment of time, the apparatus determines that an error occurs in the pulse generator, so that the flag F_VPFCMG is set to "1". If the step SC26 determines that the flag F_VPFCMG is set to "1", the flow proceeds to step SC46, then, the flow reverts control to the main routine. If the step SC26 determines that the flag F_VPFCMG is set to "0", the flow proceeds to step SC28.

In step SC28, a decision is made as to whether a flag F_FCMGV is set to "1" or not. The flag F_FCMGV is set to "1" when running speed of the vehicle is increased to a prescribed value or more at once. Namely, it indicates whether the vehicle starts running at a time or not. The prescribed value is set at 15 km/h, for example. If the step SC28 determines that the flag F_FCMGV is set to "0", the flow proceeds to step SC30 in which a decision is made as to whether a variable VP is equal to or above a variable VIDLSTC or not. The variable VP stores a number of pulses being output from the pulse generator of the wheel 14 within a prescribed time, in other words, it represents running speed of the vehicle. The variable VIDLSTC is set at 15 km/h, for example.

If a decision result of the step SC30 is "NO", the flow proceeds to step SC46, then, the flow reverts control to the main routine. If "YES", the flow proceeds to step SC32 in which the flag F_FCMGV indicating whether the vehicle starts running at once is set to "1", and a variable CBRST is set to "0". Herein, the variable CBRST stores a count value of restarts of the vehicle. Restart of the vehicle is detected by a decision whether the driver leaves his/her foot from the brake pedal to turn off the brake or not.

After completion of the step SC32, the flow proceeds to step SC34 (see FIG. 17).

If the step SC28 determines that the flag F_FCMGV is set to "1", the flow proceeds directly to step SC34 without performing steps SC30 and SC32.

In step SC34, a decision is made as to whether a flag F_FCMGBAT is set to "1" or not. The flag F_FCMGBAT is set to "1" when remaining battery charge of the battery 26 belongs to the foregoing zone $Z_1$ shown in FIG. 4A. It is set to "0" if the remaining battery charge belongs to other zones. This flag is set by the battery ECU 32. If a decision result of the step SC34 is "NO", the flow proceeds to step SC46, then, the flow reverts control to the main routine. If "YES", the flow proceeds to step SC36.

In step SC36, a decision is made as to whether a flag F_ESZONEC is set to "1" or not. The flag F_ESZONEC indicates inhibition of idle stop of the engine because remaining battery charge of the battery 26 belongs to the foregoing zone $Z_B$ or $Z_C$ shown in FIG. 4B. This flag is set by the battery ECU 32 shown in FIG. 14. If a decision result of the step SC36 is "YES", the apparatus inhibits idle stop of the engine. Hence, the flow proceeds to step SC46, then, the flow reverts control to the main routine.

If the decision result of the step SC36 is "NO", in other words, if the battery 26 is sufficiently charged to increase remaining battery charge to an extent that the idle stop of the engine is executable, the flow proceeds to step SC38.

In step SC38, a decision is made as to whether a shift position is either neutral (N), parking (P) or neutral parking (NP) or not. If a decision result of the step SC38 is "NO", the flow proceeds to step SC42 in which a decision is made as to whether a flag F_CVTED is set to "1" or not. The flag F_CVTED indicates whether the CVT 13 is placed in a D range (or drive mode) or not. This flag is set by the CVT ECU 36 shown in FIG. 14. If a decision result of the step SC42 is "NO", the apparatus inhibits idle stop of the engine. Hence, the flow proceeds to step SC46, then, the flow reverts control to the main routine.

If the decision result of the step SC38 is "YES", the flow proceeds to step SC40 in which a decision is made as to whether a flag F_STS is set to "1" or not. The flag F_STS indicates whether the starter switch is turned on or not. If a decision result of the step SC40 is "YES", the flow proceeds to step SC46, then, the flow reverts control to the main routine. If "NO", the flow proceeds to step SC44. Incidentally, the flow also proceeds to step SC44 if the decision result of the step SC42 is "YES", in other words, if the CVT 13 is placed in the D range (or drive mode).

In step SC44, a decision is made as to whether a brake switch BRKSW is ON or OFF. If the brake switch BRKSW is OFF, the apparatus inhibits idle stop of the engine. Hence, the flow proceeds to step SC46, then, the flow reverts control to the main routine. If the step SC44 determines that the brake switch BRKSW is ON, the flow proceeds to step SC48.

In step SC48, a decision is made as to whether a flag F_THIDLMG is set to "1" or not. The flag F_THIDLMG stores a state of the acceleration pedal. That is, the flag F_THIDLMG is set to "1" when the throttle is full open (or when the driver depresses the acceleration pedal by his/her foot). In addition, it is set to "0" when the throttle is full close (or when the driver does not step on the acceleration pedal). If a decision result of the step SC48 is "YES" indicating that the driver depresses the acceleration pedal, it is necessary to inhibit idle stop of the engine. So, the flow proceeds to step SC46, then, the flow reverts control to the main routine. If the decision result of the step SC48 is "NO", the flow proceeds to step SC50.

In step SC50, a decision is made as to whether a variable MPGA is equal to or above a variable #MPFCMG or not. Herein, the variable MPGA stores master power negative pressure of the servo device, and the variable #MPFCMG stores a reduced master power negative pressure to restart the engine. If a decision result of the step SC50 is "NO", it is necessary to inhibit idle stop of the engine. So, the flow proceeds to step SC46, then, the flow reverts control to the main routine. If the decision result of the step SC50 is "YES", the flow proceeds to step SC52.

In step SC52, a decision is made as to whether a flag F_HTRMG is set to "1" or not. The flag F_HTRMG stores an idle stop inhibition request being output from the air conditioner. This flag is set to "1" when idle stop of the engine is inhibited. It is set to "0" when idle stop of the engine is allowed. If a decision result of the step SC52 is "NO", the flow proceeds to step SC54.

In step SC54, the flag F_FCMGSTB indicating whether the engine ECU 18 outputs an idle stop request to the CVT,ECU 36 or not is set to "1". After completion of the step SC54, the flow proceeds to step SC56 in which a decision is made as to whether a flag F_VCTOK is set to "1" or "0". The flag F_CVTOK indicates whether the CVT ECU 36 outputs a CVT preparation completion signal to the engine ECU 18 or not.

If the step SC56 determines that the flag F_CVTOK is set to "0", the CVT 13 does not complete preparation for executing idle stop of the engine. Hence, the flow reverts control to the main routine. If the step SC56 determines that the flag F_CVTOK is set to "1", the CVT 13 completes preparation for executing idle stop of the engine. Hence, the flag F_FCMG is set to "1" in step SC58. Then, the flow reverts control to the main routine, so that the apparatus performs idle stop control on the engine.

If the decision result of the step SC52 is "YES", in other words, the air conditioner outputs an idle stop inhibition request, the flow proceeds to step SC60 in which a decision is made as to whether the variable VP representing running speed of the vehicle is equal to or above a variable #VIDLST representing a prescribed speed (e.g., 15 km/h) or not. If a decision result of the step SC60 is "YES", the flow proceeds to step SC46, then, the flow reverts control to the main routine.

If the decision result of the step SC60 is "NO", the flag F_FCMGV indicating that the vehicle starts running at once is set to "0" in step SC62. After completion of the step SC62, the flow proceeds to step SC46, then, the flow reverts control to the main routine. The idle stop determination process of FIGS. 16 and 17 is designed such that the step SC58 is disregarded when the flag F_FCMGV is "0", hence, idle stop of the engine is not executed. In other words, the steps SC60 and SC62 are used to inhibit idle stop of the engine if running speed of the vehicle is relatively low.

As described above, the apparatus performs the idle stop determination process to determine whether idle stop of the engine is being executed or not.

Next, a description will be given with respect to engine restart determination process to determine whether the engine is being restarted in an idle stop mode or not.

Figure 18:
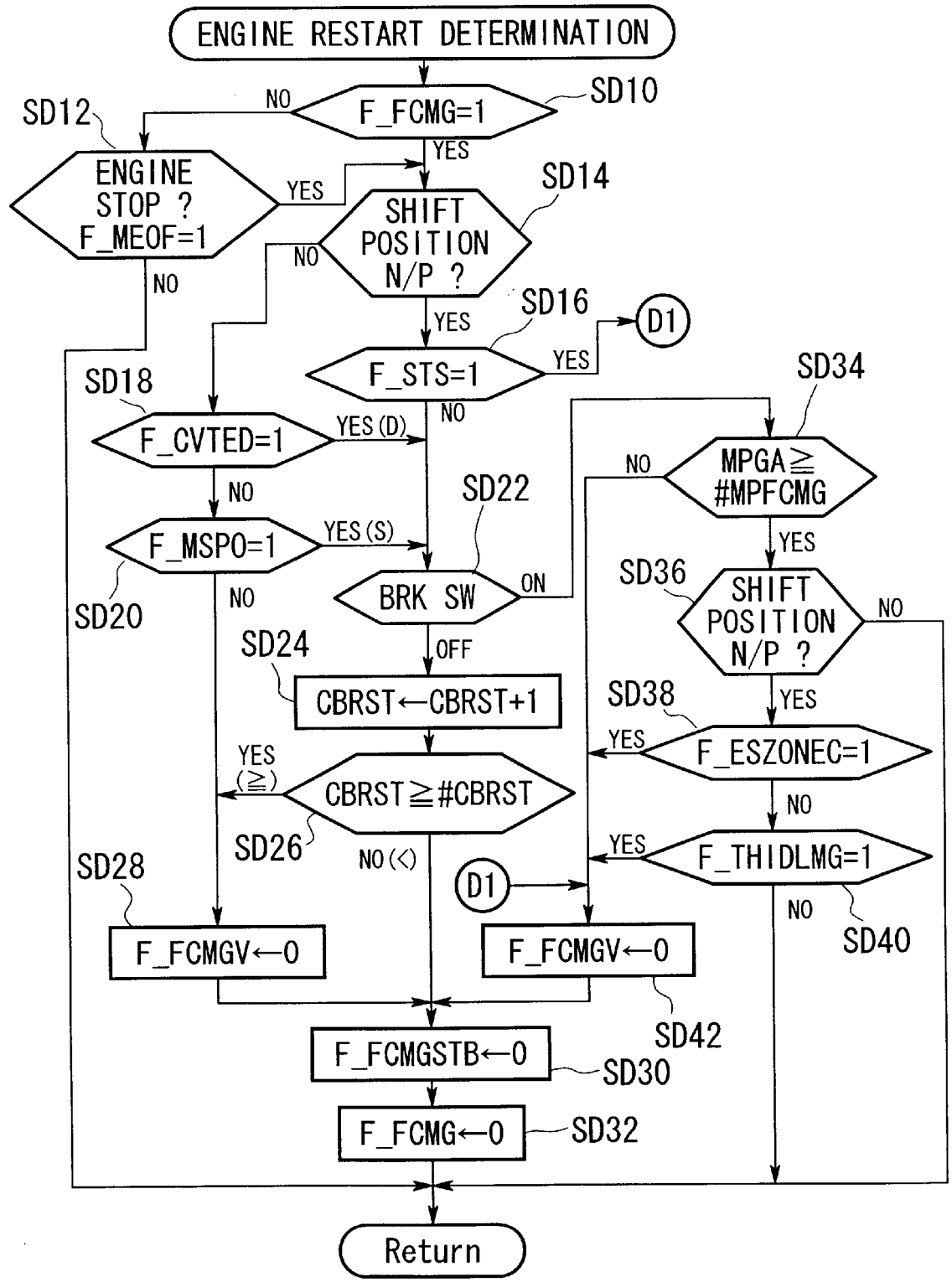
FIG. 18 is a flowchart showing an engine restart determination process in accordance with the second embodiment.

FIG. 18 shows the engine restart determination process in accordance with the second embodiment of the invention. The apparatus calls the process of FIG. 18 to be executed from the main routine (not shown) every prescribed interval of time (e.g., every 10 msec). Actually, the engine ECU 18 shown in FIG. 14 performs steps of the process of FIG. 18. Determination whether to restart the engine or not is made by a decision as to whether a flag F_FCMG shown in FIG. 18 is set to "0" or not. The aforementioned process of FIGS. 16 and 17 is carried out in such a way that idle stop determination is made by setting the flag F_FCMG to "1". In the process of FIG. 18, engine restart determination is made by resetting the flag F_FCMG, which is previously set to "1", to "0".

When the apparatus calls the process of FIG. 18 to be executed from the main routine, flow firstly proceeds to step SD10 in which a decision is made as to whether the flag F_FCMG is set to "1" or not. This step is required to reset the flag F_FCMG, which is set to "1" by the aforementioned process of FIGS. 16 and 17, to "0". That is, this step is provided to prevent following steps from being unnecessarily executed if the flag F_FCMG has been already set to "0" before starting of the process of FIG. 18. If a decision result of the step SD10 is "NO", the flow proceeds to step SD12.

In step SD12, a decision is made as to whether a flag F_MEOF is set to "1" or not. The flag F_MEOF is set to "1" when engine speed is zero. In other words, this step makes determination for engine stop. Namely, if the flag F_FCMG is "0" so that idle stop of the engine is inhibited, it is determined that the engine is running, so a decision result of the step SD12 is "NO". Hence, the flow reverts control to the main routine.

If the flag F_MEOF is "1" indicating that the engine speed is zero under the condition where idle stop of the engine is inhibited, it is assumed that an engine stop occurs, so the decision result of the step SD12 is "YES". In that case, it is necessary to perform engine restart determination, hence, the flow proceeds to step SD14. The aforementioned situation where the engine speed becomes zero under inhibition of the idle stop of the engine is caused to occur by "careless" operations of the driver who operates the vehicle to stop while maintaining engagement of gears, for example.

In step SD14, a decision is made as to whether a shift position is either neutral (N), parking (P) or neutral parking (NP) or not. If a decision result of the step SD14 is "NO", the flow proceeds to step SD18 in which a decision is made as to whether a flag F_CVTED indicating whether the CVT 13 is placed in a D range (or drive mode) is set to "1" or not. If a decision result of the step SD18 is "NO" indicating that the CVT 13 is not placed in the D range, the flow proceeds to step SD20 in which a decision is made as to whether a flag F_MSPO is set to "1" or not. The flag F_MSPO indicates whether the CVT 13 is placed in an S range (or sports mode) or not. It is set to "1" in response to the S range being selected.

If a decision result of the step SD20 is "NO", the flow proceeds to step SD28 in which a flag F_FCMGV indicating whether the vehicle starts running at once is set to "0". After completion of the step SD28, the flow proceeds to step SD30 in which a flag F_FCMGSTB indicating whether the engine ECU 18 outputs an idle stop request signal to the CVT ECU 36 is set to "0". Thus, the engine ECU 18 outputs an idle stop release signal to the CVT ECU 36. After completion of the step SD30, the flow proceeds to step SD32 in which the flag F_FCMG is set to "0". Then, the flow reverts control to the main routine. Since the flag F_FCMG is "0", the apparatus controls the engine to restart.

If the decision result of the step SD14 is "YES", in other words, if the apparatus discriminates that the shift position is either neutral (N), parking (P) or neutral parking (NP), the flow proceeds to step SD16 in which a decision is made as to whether a flag F_STS is set to "1" or not. The flag F_STS indicates whether the starter switch is ON or not. If a decision result of the step SD16 is "YES", the flow proceeds to step SD42 in which the flag F_FCMGV indicating whether the vehicle starts running at once is set to "0". After completion of the step SD42, the flow proceeds to step SD30 in which the flag F_FCMGSTB is set to "0", so that the engine ECU 18 outputs an idle stop release signal to the CVT ECU 36. In step SD32, the flag F_FCMG is set to "0". Then, the flow reverts control to the main routine. Since the flag F_FCMG is "0", the apparatus controls the engine to restart.

If the decision result of the step SD 16 is "NO", in other word, if it is determined that the starter switch is not ON, the flow proceeds to step SD22. In addition, the flow also proceeds to step SD22 if the decision result of the step SD18 is "YES" so that the CVT 13 is placed in the D range (or drive mode) or if the decision result of the step SD20 is "YES" so that the CVT 13 is placed in the S range (or sports mode).

Next, a description will be given with respect to a reason why the flow proceeds from the step SD20 to the step SD22. Consider that the step SD20 is excluded from the process of FIG. 18. In that case, if the decision result of the step SD18 is "NO", the flow must proceed to steps SD28, SD30 and SD32, so that the apparatus controls the engine to restart. In the case where the CVT 13 is placed in the S range (or sports mode), both of the decision results of the steps SD14 and SD18 are "NO", so that the apparatus controls the engine to restart. As a result, when the driver changes a mode of the CVT 13 from the D range (or drive mode) to the S range (or sports mode), the apparatus controls the engine to restart. As described before, the driver performs idle stop controls and engine restart controls on the vehicle having the CVT 13 in principle by depressing and releasing the brake pedal under prescribed conditions in running. Therefore, it is not preferable that the engine restart controls are carried out in response to a changeover of the mode of the CVT 13. For this reason, the process of FIG. 18 introduces the step SD20, from which the flow proceeds to step SD22 for determination whether the driver steps on the brake pedal or not.

In step SD22, a decision is made as to whether the driver depresses the brake pedal by his/her foot so that the brake switch BRKSW is ON or not. If the step SD22 determines that the driver does not depress the brake pedal, the flow proceeds to step SD24 in which a variable CBRST is incremented. The variable CBRST stores a count value of restarts of the vehicle. Restart of the vehicle is detected when the driver leaves his/her foot from the brake pedal so that the brake switch BRKSW is OFF.

After completion of the step SD24, the flow proceeds to step SD26 in which a decision is made as to whether the variable CBRST is equal to or above a variable #CBRST or not. Herein, the variable CBRST stores the (incremented) count value of restarts of the vehicle, while the variable #CBRST stores a prescribed value which is set to "2", for example. If a decision result of the step SD26 is "YES", the flow proceeds to step SD28 in which the flag F_FCMGV is set to "0". In other words, if the engine is restarted a prescribed number of times (e.g., two times) or more, the flag F_FCMGV indicating whether the vehicle starts running at once is set to "0". Therefore, the apparatus inhibits idle stop of the engine until running speed of the vehicle exceeds a prescribed speed (e.g., 15 km/h). So, the flow proceeds to steps SD30 and SD32, then, the flow reverts control to the main routine, so that the apparatus controls the engine to restart.

If the decision result of the step SD26 is "NO", the flow proceeds to step SD30. That is, since the engine is not restarted the prescribed number of times, it is necessary to inhibit idle stop after restart of the engine. So, the flow proceeds to steps SD30 and SD32, then, the flow reverts control to the main routine, so that the apparatus controls the engine to restart.

If the step SD22 determines that the driver depresses the brake pedal by his/her foot, the flow proceeds to step SD34 in which a decision is made as to whether a variable MPGA is equal to or above a variable #MPFCMG or not. The variable MPGA stores master power negative pressure of the servo device. If a decision result of the step SD34 is "NO" indicating that the master power negative pressure is small, the flow proceeds to steps SD42, SD30 and SD32, then, the flow reverts control to the main routine. Thus, the apparatus controls the engine to restart in order to increase the master power negative pressure.

If the decision result of the step SD34 is "YES" indicating that the master power negative pressure is large, the flow proceeds to step SD36 in which a decision is made as to whether a shift position is either neutral (N), parking (P) or neutral parking (NP) or not. If a decision result of the step SD36 is "NO", the flow reverts control to the main routine, so that the apparatus continues idle stop of the engine. If the decision result of the step SD36 is "YES", the flow proceeds to step SD38.

In step SD38, a decision is made as to whether a flag F_ESZONEC is set to "1" or not. That is, the step SD38 determines that remaining battery charge of the battery 26 is relatively small under the prescribed shift position which is either neutral (N), parking (P) or neutral parking (NP). In that case, it is necessary to compulsorily restart the engine. Hence, if a decision result of the step SD38 is "YES", the flow proceeds to steps SD42, SD30 and SD32, then, the flow reverts control to the main routine, so that the apparatus controls the engine to restart. If the decision result of the step SD38 is "NO", the flow proceeds to step SD40.

In step SD40, a decision is made as to whether a flag F_THIDLMG storing a state of the acceleration pedal is set to "1" or not. If a decision result of the step SD40 is "YES", the flow proceeds to steps SD42, SD30 and SD32, then, the flow reverts control to the main routine, so that the apparatus controls the engine to restart. In this case, since the driver steps on the brake pedal while depressing the acceleration pedal, the apparatus controls the engine to restart. If the decision result of the step SD40 is "NO", the flow reverts control to the main routine, so that the apparatus continues idle stop of the engine.

As described above, the preferred embodiments are respectively described with respect to actualization of the engine automatic start stop control apparatus of this invention. Of course, this invention is not necessarily limited by the embodiments, hence, it is possible to freely modify the embodiments within the scope of the invention. The embodiments exclusively describe the hybrid vehicles. Of course, technical features of this invention are applicable to other types of vehicles (e.g., normal automobiles which run with internal-combustion engines without using electric motor assists). In the aforementioned process of FIG. 9, the outside air temperature is estimated from the engine intake air temperature after the vehicle runs for the prescribed time. It is possible to exclude this process if the vehicle is equipped with a temperature sensor that directly measures the outside air temperature.

The first embodiment (see FIG. 2) describes about the vehicle equipped with the manual transmission 12, while the second embodiment (see FIG. 14) describes about the vehicle equipped with the CVT 13. Of course, technical points of the embodiments are applicable to the vehicle equipped with automatic transmission (AT).

As described heretofore, this invention has a variety of technical features and effects, which are summarized as follows:

(1) This invention includes an automatic start device that basically controls the engine to restart based upon determination for restarting the engine under an engine stop mode. This device also controls the engine to restart when the driver depresses the clutch pedal or when the driver does not depress the brake pedal under the specific situation where the engine stalls due to an error operation of the driver so that the engine speed becomes zero.

(2) So, even if the driver mistakenly recognizes that the engine is automatically stopped due to automatic stop control although the engine actually stalls due to the error operation of the driver, it is possible to restart the engine by operations similar to the prescribed operation for restarting the engine under the automatic stop mode. Therefore, it is possible to improve drivability for the driver who handles the vehicle.

(3) This invention is applicable to the hybrid vehicle which installs both of an engine and an electric motor. Herein, the hybrid vehicle is capable of independently running by only using the electric motor. In the case of the hybrid vehicle, there is a great probability in that the driver fails to recognize an engine stall. However, this invention is capable of automatically restarting the engine in response to the engine stall. Thus, it is possible to avoid an unwanted situation where the battery coupled to the electric motor is not electrically charged for a long time because the engine stall continues due to lack of recognition of the driver.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An engine automatic start stop control apparatus that controls an engine to be automatically stopped and started in response to driving conditions of a hybrid vehicle, comprising:

an internal combustion engine cooperating with an electric motor to drive the hybrid vehicle;

an engine speed detection device for detecting an engine speed of the engine;

a clutch detection device for detecting a depression of a clutch pedal;

an automatic stop detection device for detecting an idle stop of the engine; and an automatic start device for automatically starting the engine if the clutch detection device detects the depression of the clutch pedal, the engine speed detection device detects that the engine speed is zero, and the automatic stop detection device does not detect the idle stop of the engine.

2. An engine automatic start stop control apparatus that controls an engine to be automatically stopped and started in response to driving conditions of a hybrid vehicle, comprising:

an internal combustion engine cooperating with an electric motor to drive the hybrid vehicle;

an engine speed detection device for detecting an engine speed of the engine;

a brake detection device for detecting a depression of a brake pedal;

an automatic stop detection device for detecting an idle stop of the engine; and an automatic start device for automatically starting the engine if the brake detection device does not detect the depression of the brake pedal, the engine speed detection device detects that the engine speed is zero, and the automatic stop detection device does not detect the idle stop of the engine.

3. A method for engine automatic start stop control in which an engine of a hybrid vehicle is controlled to be automatically stopped and started in response to driving conditions of the vehicle, said method comprising the steps of:

driving the vehicle using an internal combustion engine and an electric motor;

detecting an engine speed of the engine;

detecting a depression of a clutch pedal;

detecting an idle stop of the engine; and automatically starting the engine if the depression of the clutch pedal is detected while the engine speed is zero and the idle stop of the engine is not detected.

4. A method for engine automatic start stop control in which an engine of a hybrid vehicle is controlled to be automatically stopped and started in response to driving conditions of the vehicle, said method comprising the steps of:

driving the vehicle using an internal combustion engine and an electric motor;

detecting an engine speed of the engine;

detecting a depression of a brake pedal;

detecting an idle stop of the engine; and automatically starting the engine if the depression of the brake pedal is not detected while the engine speed is zero and the idle stop of the engine is not detected.

* * * * *